(12) United States Patent
Miller et al.

(10) Patent No.: US 6,965,630 B1
(45) Date of Patent: Nov. 15, 2005

(54) MODE CONTROLLER FOR SIGNAL ACQUISITION AND TRACKING IN AN ULTRA WIDEBAND COMMUNICATION SYSTEM

(75) Inventors: Timothy R. Miller, Washington, DC (US); Richard Shaner, Laurel, MD (US)

(73) Assignee: Freescale Semiconductor, Inc., Austin, TX (US)

( * ) Notice: Subject to any disclaimer, the term of this patent is extended or adjusted under 35 U.S.C. 154(b) by 813 days.

(21) Appl. No.: 09/685,197

(22) Filed: Oct. 10, 2000

(51) Int. Cl.⁷ .............................................. H04B 1/69

(52) U.S. Cl. ................. 375/130; 375/136; 375/142; 375/147; 370/210

(58) Field of Search ................................ 375/130, 136, 375/142, 145, 147, 149, 150; 370/210

(56) References Cited

U.S. PATENT DOCUMENTS

| | | | |
|---|---|---|---|
| 5,533,047 A * | 7/1996 | Mourot et al. ............... | 375/149 |
| 5,642,377 A * | 6/1997 | Chung et al. ................ | 375/145 |
| 5,832,035 A | 11/1998 | Fullerton | |
| 6,081,822 A * | 6/2000 | Hillery et al. .............. | 708/445 |
| 6,351,246 B1 | 2/2002 | McCorkle | |
| 6,363,049 B1 * | 3/2002 | Chung ......................... | 370/210 |
| 6,505,032 B1 | 1/2003 | McCorkle | |
| 6,700,939 B1 | 3/2004 | McCorkle | |
| 6,735,238 B1 | 5/2004 | McCorkle | |

FOREIGN PATENT DOCUMENTS

WO   WO 96/09694   3/1996

OTHER PUBLICATIONS

P. Withington, et al., Military Communications Conference Proceedings, pp. 1186-1190, XP-010369746, "Preliminary Results of an Ultra-Wideband (Impulse) Scanning Receiver", Oct. 31, 1999.
Richard Comerford, IEEE Spectrum, pp. 35-41, "Handhelds Duke it out for the Internet", Aug. 2000.
U.S. Appl. No. 60/207,225, McCorkle, filed May 26, 2000.
U.S. Appl. No. 60/217,099, Miller, filed Jul. 10, 2000.
U.S. Appl. No. 09/633,815, filed Aug, 7, 2000, McCorkle.
U.S. Appl. No. 60/238,466, McCorkle, filed Oct. 10, 2000.
U.S. Appl. No. 09/684,401, filed Oct. 10, 2000, Miller.
U.S. Appl. No. 09/684,782, filed Oct. 10, 2000, McCorkle.
U.S. Appl. No. 09/685,195, filed Oct. 10, 2000, Miller.
U.S. Appl. No. 09/685,196, filed Oct. 10, 2000, Miller.
U.S. Appl. No. 09/685,198, filed Oct. 10, 2000, McCorkle.
U.S. Appl. No. 09/685,199, filed Oct. 10, 2000, McCorkle.
U.S. Appl. No. 09/685,200, filed Oct. 10, 2000, McCorkle.
U.S. Appl. No. 09/685,202, filed Oct. 10, 2000, Rofheart.
U.S. Appl. No. 09/685,203, filed Oct. 10, 2000, Miller.
U.S. Appl. No. 09/685, 2005, filed Oct. 10, 2000, McCorkle.

* cited by examiner

*Primary Examiner*—Shuwang Liu
(74) *Attorney, Agent, or Firm*—Posz Law Group, PLC

(57) ABSTRACT

A system and method for controlling the mode of operation in a UWB receiver. In one variation, the system and method determines the mode of operation by reading a set number of samples of the signal, estimating mode parameters, calculating a mode probability, and then transitioning in a finite state machine from either a tracking to an acquisition state or vice versa depending on the value of the mode probability. Exemplary versions of the mode controller include a signal to noise ratio calculator, a signal and noise power estimator, and an AGC initialization circuit.

78 Claims, 15 Drawing Sheets

MODE CONTROLLER FOR SIGNAL ACQUISITION AND TRACKING IN AN ULTRA WIDEBAND COMMUNICATION SYSTEM

BACKGROUND OF THE INVENTION

1. Field of the Invention

The present invention relates to radio frequency communication receivers, systems and methods employing ultra wide bandwidth (UWB) signaling techniques. More particularly, the present invention relates to the systems and methods configured to control in a receiver when to acquire the UWB signal and when to track the incoming UWB signal to maintain quality of service.

2. Description of the Background

In wireless communication systems, a transmitter takes data and sends the data to an amplifier and antenna, which converts the data from electrical signals into electromagnetic radiation. This electromagnetic radiation propagates through the air and is converted into an electrical current by an antenna coupled to a receiver. These currents (or voltage) are then amplified before being sent to a converter to convert the electrical signals into digital samples and subsequently processed to extract the source information from the signal.

In order to maintain a particular quality of service at the receiver, the receiver "locks" on to the incoming signal. Thus, the receiver monitors the signal strength of the incoming signal, and employs a device to determine when the receiver should be placed in a signal tracking mode of operation or a signal acquire mode of operation. More detailed descriptions of receiver synchronization are found in Chapter 8 of "Digital Communications" B. Sklar, Prentice Hall, 1988, the entire contents of which are incorporated by reference herein.

Some radios have some type of mode controller incorporated into the receiver. The mode controller monitors the received incoming signal and determines whether the signal to noise ratio (SNR) is sufficient to maintain an acceptable quality of service. If the mode controller determines that the SNR is not sufficient, the receiver is forced out of a tracking state and into an acquisition state.

Some radios use a RSSI (received signal strength indicator) to determine what mode, i.e., tracking or acquisition, the mode controller should be in. The RSSI measures purely incoming signal strength. However, a problem with these type of controllers is that when the noise power increases significantly, the signal strength still shows acceptability when, in fact, the quality of the signal is noisy and unacceptable.

Other radios use two RSSIs—one to measure signal power and the other to measure noise power. The noise power is measured in an out-of-band region of the spectrum presumably unoccupied by any signals. Assuming the noise is the same in the out-of band region as in the in-band region, this measure presumably indicating an accurate noise power for the in-band region. Consequently, the out-of-band noise power is presumed to be the same as the in-band noise power, i.e. noise coupled with the incoming signal. Neither presumption may be correct. The presumed unoccupied region may contain some signal, which would affect the estimate of the assumed noise power, and the out-of-band noise power may not be the same as the in-band noise power. These radios estimate SNR from the in-band signal measure and out-of-band noise measure. The underlying presumption that noise changes little over relatively small frequency ranges empowers such techniques for narrowband systems.

Out-of-band noise for UWB systems holds no significance. Hence, a truer estimate of SNR is desired.

The present inventors recognize that in order to get a true indication of radio performance, both signal and noise power should be measured and both measurements should be taken in-band, especially for UWB systems. The true indication of radio performance allows the mode controller to accurately switch between the acquisition and tracking states of the radio, preventing erroneous acquisitions, which adversely affect system throughput because the receiver spends time trying to acquire a signal when it should be receiving data at an acceptable bit error rate (BER).

Such erroneous transitions to the acquisition mode arise in systems where the incoming signal is prone to burst error or intermittent signal loss, for example. The bursty nature of the incoming signal is particularly true for a UWB channel. In these bursty communication channels, the receiver can frequently forced out of the tracking state, due to a short outage, no longer receiving the signal. The radio attempts to reacquire the signal in order to get an acceptable SNR even though the reception outage time is relatively short. These frequent reception interruptions while the radio attempt reacquisition adversely affect the system's effective throughput.

The challenge is to effectively determine when a receiver should transition between a tracking state and an acquisition state in a way that minimizes degradation of quality of service (e.g., acceptable BER at a certain throughput).

SUMMARY OF THE INVENTION

Consistent with the title of this section, only a brief description of selected features of the present invention is now presented. A more complete description of the present invention is the subject of this entire document.

An object of the present invention is to provide a UWB receiver that includes a synchronization mode controller that estimates signal power of an incoming UWB signal relative to background noise to determine a SNR, and from the SNR determine whether the receiver should be in acquisition or tracking mode.

Another object of the present invention is to provide a UWB receiver that includes a mode controller that uses a processor for efficiently calculating SNR in order to determine whether the receiver should be in acquisition or tracking mode.

Another feature of the present invention is to address the above-identified and other deficiencies of conventional communications systems and methods.

These and other objects are accomplished by way of a radio receiver configured to receive UWB transmissions. While several embodiments are disclosed herein, one embodiment would be to include a signal to noise ratio calculator, while another would be to include a signal and noise power estimator for detecting whether a receiver is locked onto an incoming UWB signal and whether a receiver should be in acquisition or tracking mode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
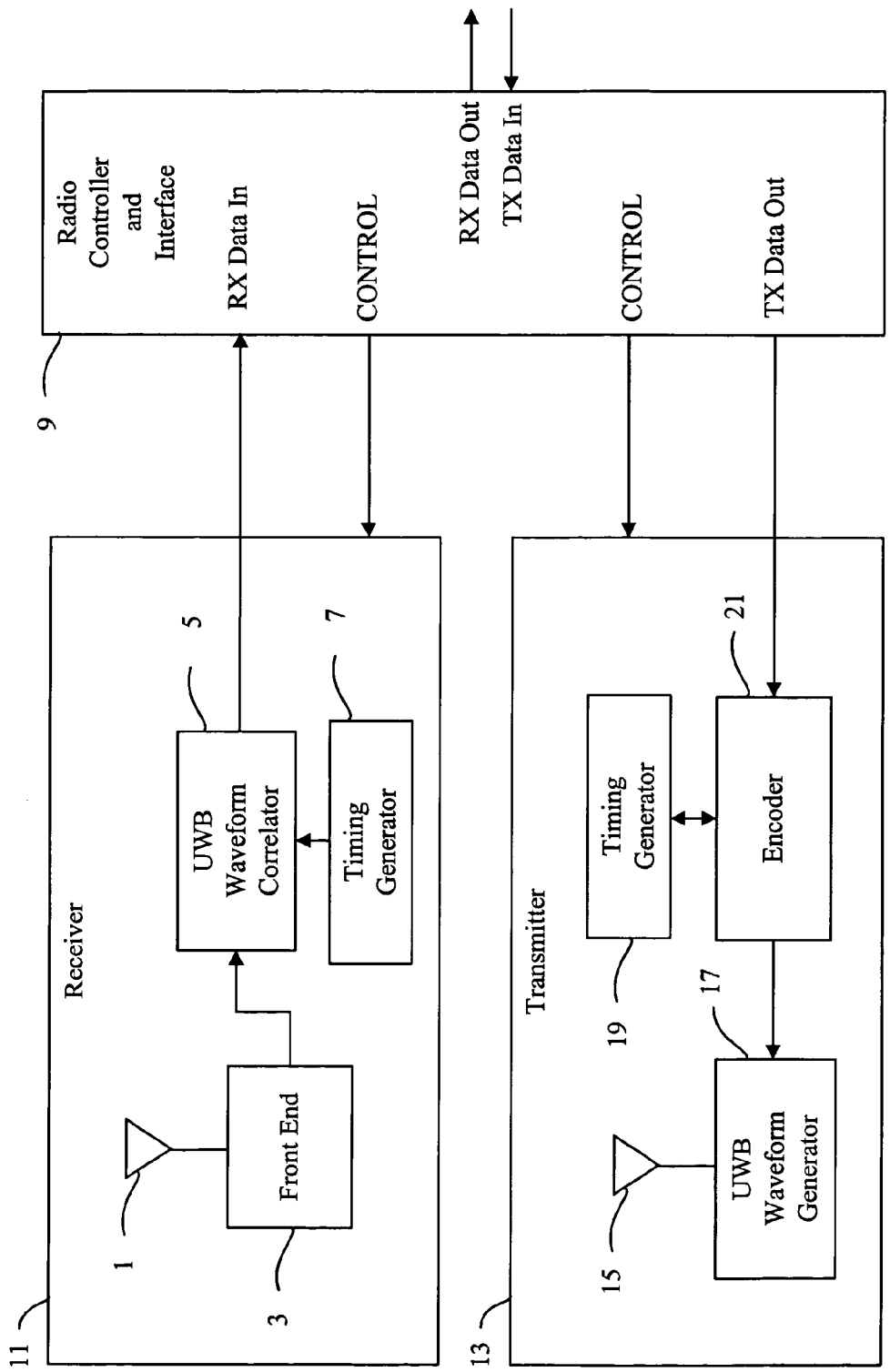
FIG. 1a is a block diagram of an ultra-wide band (UWB) transceiver, according to the present invention.

Referring now to the drawings, wherein like reference numerals designate identical or corresponding parts throughout the several views.

FIG. 1a is a block diagram of an ultra-wide band (UWB) transceiver. In FIG. 1a, the transceiver includes three major components, namely, receiver 11, radio controller and interface 9, and transmitter 13. Alternatively, the system may be implemented as a separate receiver 11 and radio controller and interface 9, and a separate transmitter 13 and radio controller and interface 9. The radio controller and interface 9 serves as a media access control (MAC) interface between the UWB wireless communication functions implemented by the receiver 11 and transmitter 13 and applications that use the UWB communications channel for exchanging data with remote devices.

The receiver 11 includes an antenna 1 that converts a UWB electromagnetic waveform into an electrical signal (or optical signal) for subsequent processing. The UWB signal is generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In one embodiment of the present invention, each wavelet communicates one bit, for example, using two shapes such as bi-phase. In other embodiments of the present invention, each wavelet may be configured to communicate nn bits, where $M \geq 2^{nn}$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1, +a1, −a1, +a2, −a2, ..., +aN, −aN), (iii) quadrature phase signals (+1, −1, +j, −j), (iv) multi-phase signals (1, −1, exp(+jπ/N), exp(−jπ/N), exp(+jπ2/N), exp(−j2/N), ..., exp(+j(N−1)/N), exp(−jπ(N−1)/N)), (v) multilevel multi-phase signals ($a_i \exp(j2\pi\beta/N) | a_i \in \{1, a1, a2, ..., aK\}, \beta \in \{0, 1, ..., N-1\}$), (vi) frequency modulated pulses, (vii) pulse position modulation (PPM) signals (possibly same shape pulse transmitted in different candidate time slots), (viii) M-ary modulated waveforms $g_{B_i}(t)$ with $B_i \in \{1, ... M\}$, and (ix) any combination of the above waveforms, such as multi-phase channel symbols transmitted according to a chirping signaling scheme. The present invention, however, is applicable to variations of the above modulation schemes and other modulation schemes (e.g., as described in Lathi, "Modern Digital and Analog Communications Systems," Holt, Rinehart and Winston, 1998, the entire contents of which is incorporated by reference herein), as will be appreciated by those skilled in the relevant art(s).

Some exemplary waveforms and characteristic equations thereof will now be described. The time modulation component, for example, can be defined as follows. Let $t_i$ be the time spacing between the $(i+1)^{th}$ pulse and the $i^{th}$ pulse. Accordingly, the total time to the $i^{th}$ pulse is $$T_i = \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermined set of a and k. Here, a and k may also be chosen from a finite set based on the user code or encoded data.

An embodiment of the present invention can be described using M-ary modulation. Equation 1 below can be used to represent a sequence of exemplary transmitted or received pulses, where each pulse is a shape modulated UWB wavelet, $g_{B_i}(t-T_i)$ $$x(t) = \sum_{i=0}^{\infty} g_{B_i}(t - T_i) \tag{1}$$

In the above equation, the subscript i refers to the $i^{th}$ pulse in the sequence of UWB pulses transmitted or received. The wavelet function g has M possible shapes, and therefore $B_i$ represents a mapping from the data, to one of the M-ary modulation shapes at the $i^{th}$ pulse in the sequence. The wavelet generator hardware (e.g., the UWB waveform generator 17) has several control lines (e.g., coming from the radio controller and interface 9) that govern the shape of the wavelet. Therefore, $B_i$ can be thought of as including a lookup-table for the M combinations of control signals that produce the M desired wavelet shapes. The encoder 21 combines the data stream and codes to generate the M-ary states. Demodulation occurs in the waveform correlator 5 and the radio controller and interface 9 to recover to the original data stream. Time position and wavelet shape are combined into the pulse sequence to convey information, implement user codes, etc.

In the above case, the signal is comprised of wavelets from i=1 to infinity. As i is incremented, a wavelet is produced. Equation 2 below can be used to represent a generic wavelet pulse function, whose shape can be changed from pulse to pulse to convey information or implement user codes, etc.

$$g_{B_i}(t) = Re(B_{i,1}) \cdot f_{B_{i,2}, B_{i,3}, \ldots}(t) + Im(B_{i,1}) \cdot h_{B_{i,2}, B_{i,3}, \ldots}(t) \quad (2)$$

In the above equation, function $f$ defines a basic wavelet shape, and function $h$ is simply the Hilbert transform of the functions $f$. The parameter $B_{i,1}$ is a complex number allowing the magnitude and phase of each wavelet pulse to be adjusted, i.e., $B_{i,1} = a_I \angle \theta_i$, where $a_I$ is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes $f$ that are derivatives of a Guassian waveform as defined by Equation 3 below.

$$f_{B_i}(t) = \Psi(B_{i,2}, B_{i,3}) \left( \frac{d^{B_{i,3}}}{dt^{B_{i,3}}} e^{-[B_{i,2}t]^2} \right) \quad (3)$$

In the above equation, the function $\Psi()$ normalizes the peak absolute value of $f_{B_i}(t)$ to 1. The parameter $B_{i,2}$ controls the pulse duration and center frequency. The parameter $B_{i,3}$ is the number of derivatives and controls the bandwidth and center frequency.

Another exemplary waveform sequence x(t) can be based on a family of wavelet pulse shapes $f$ that are Gaussian weighted sinusoidal functions, as described by Equation 4 below.

$$f_{B_{i,2}, B_{i,3}, B_{i,4}} = f_{\omega_i, k_i, b_i}(t) = e^{-[b_i t]^2} \sin(\omega_i t + k_i t^2). \quad (4)$$

In the above equation, $b_i$ controls the pulse duration, $\omega_i$ controls the center frequency, and $k_i$ controls a chirp rate. Other exemplary weighting functions, beside Gaussian, that are also applicable to the present invention include, for example, Rectangular, Hanning, Hamming, Blackman-Harris, Nutall, Taylor, Kaiser, Chebychev, etc.

Another exemplary waveform sequence x(t) can be based on a family of wavelet pulse shapes $f$ that are inverse-exponentially weighted sinusoidal functions, as described by Equation 5 below.

$$g_{B_i}(t) = \left( \frac{1}{e^{\frac{-(t-t1_i)}{3 \cdot tr_i}} + 1} - \frac{1}{e^{\frac{-(t-t2_i)}{3 \cdot tr_i}} + 1} \right) \cdot \sin(\theta_i + \omega_i t + k_i t^2) \quad (5)$$

where $\{B_{i,2}, B_{i,3}, B_{i,4}, B_{i,5}, B_{i,6}, B_{i,7}, B_{i,8}\} = \{t1_i, t2_i, tr_i, tf_i, \theta_i, \omega_i, k_i\}$ In the above equation, the leading edge turn on time is controlled by t1, and the turn-on rate is controlled by tr. The trailing edge turn-off time is controlled by t2, and the turn-off rate is controlled by tf. Assuming the chirp starts at t=0 and $T_D$ is the pulse duration, the starting phase is controlled by $\theta$, the starting frequency is controlled by $\omega$, the chirp rate is controlled by k, and the stopping frequency is controlled by $\omega + kT_D$. An example assignment of parameter values is $\omega = 1$, tr=tf0.25, t1=tr/0.51, and t2=$T_D$-tr/9.

A feature of the present invention is that the M-ary parameter set used to control the wavelet shape is chosen so as to make a UWB signal, wherein the center frequency $f_c$ and the bandwidth B of the power spectrum of g(t) satisfies $2f_c > B > 0.25 f_c$. It should be noted that conventional equations define in-phase and quadrature signals (e.g., often referred to as I and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25 f_c$ and toward $2f_c$. A key attribute of the exemplary wavelets (or e.g., those described in co-pending U.S. patent application Ser. No. 09/209,460, the contents of which are incorporated herein by reference) is that the parameters are chosen such that neither $f$ nor $h$ in Equation 2 above has a DC component, yet $f$ and $h$ exhibit the required wide relative bandwidth for UWB systems.

Similarly, as a result of $B > 0.25 f_c$, it should be noted that the matched filter output of the UWB signal is typically only a few cycles, or even a single cycle. For example, the parameter n in Equation 3 above may only take on low values (e.g., such as those described in co-pending U.S. patent application Ser. No. 09/209,460).

Figure 1B:
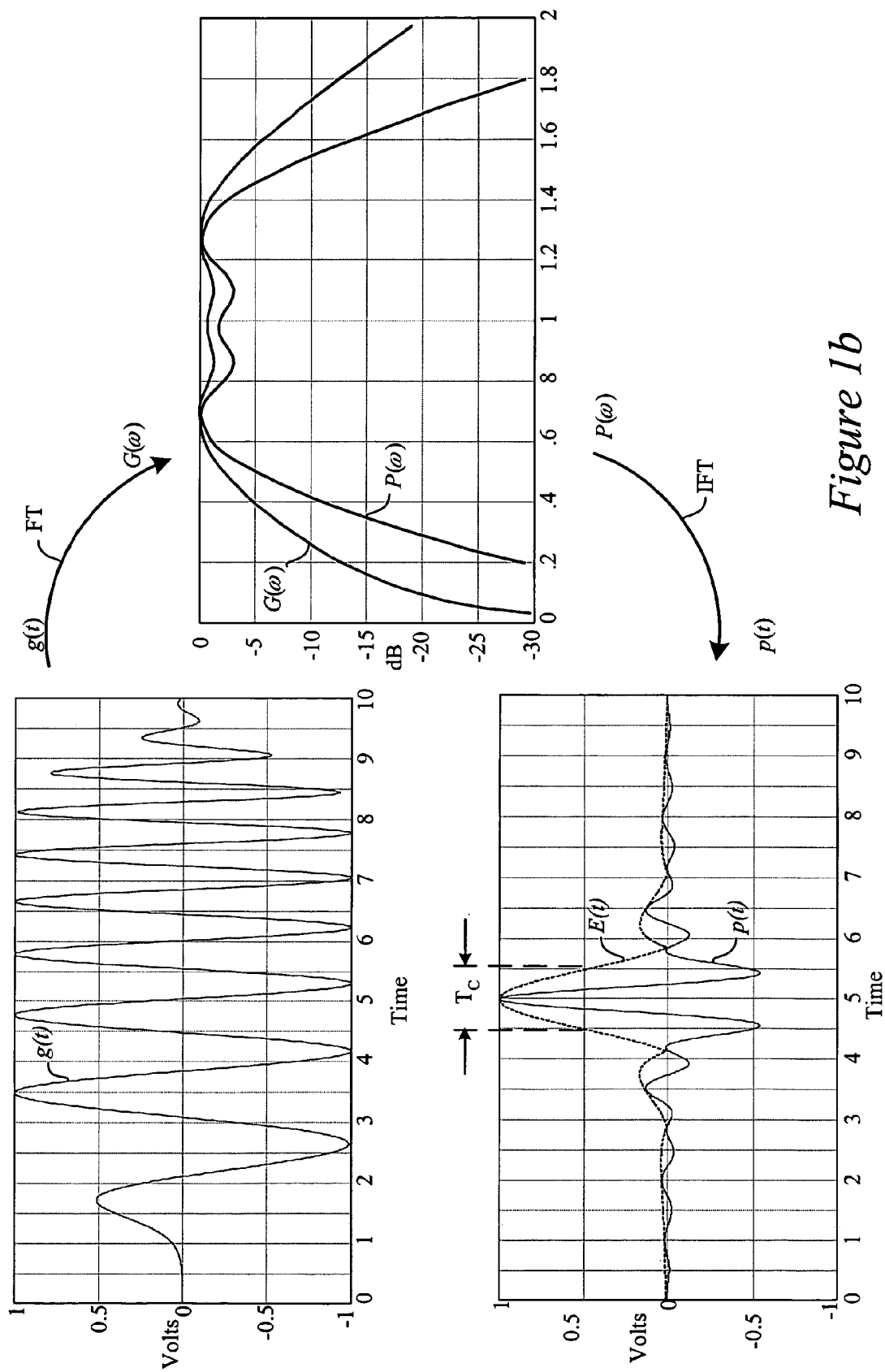
FIG. 1b is a diagram for illustrating the operation of the transceiver of FIG. 1a, according to the present invention.

The compressed (i.e., coherent matched filtered) pulse width of a UWB wavelet will now be defined with reference to FIG. 1b. In FIG. 1b, the time domain version of the wavelet thus represents g(t) and the Fourier transform (FT) version is represented by G($\omega$). Accordingly, the matched filter is represented as G*($\omega$), the complex conjugate, so that the output of the matched filter is P($\omega$)=G($\omega$)·G*($\omega$). The output of the matched filter in the time domain is seen by performing an inverse Fourier transform (IFT) on P($\omega$) so as to obtain p(t), the compressed or matched filtered pulse. The width of the compressed pulse p(t) is defined by $T_C$, which is the time between the points on the envelope of the compressed pulse E(t) that are 6 dB below the peak thereof, as shown in FIG. 1b. The envelope waveform E(t) may be determined by Equation 6 below.

$$E(t) = \sqrt{(p(t))^2 + (p^H(t))^2} \quad (6)$$

where $p^H(t)$ is the Hilbert transform of p(t).

Accordingly, the above-noted parameterized waveforms are examples of UWB wavelet functions that can be controlled to communicate information with a large parameter space for making codes with good resulting autocorrelation and cross-correlation functions. For digital modulation, each of the parameters is chosen from a predetermined list according to an encoder that receives the digital data to be communicated. For analog modulation, at least one parameter is changed dynamically according to some function (e.g., proportionally) of the analog signal that is to be communicated.

Referring back to FIG. 1a, the electrical signals coupled in through the antenna 1 are passed to a radio front end 3. Depending on the type of waveform, the radio front end 3 processes the electric signals so that the level of the signal and spectral components of the signal are suitable for processing in the UWB waveform correlator 5. The UWB waveform correlator 5 correlates the incoming signal (e.g., as modified by any spectral shaping, such as a matched filtering, partially matched filtering, simply roll-off, etc., accomplished in front end 3) with different candidate signals generated by the receiver 11, so as to determine when the receiver 11 is synchronized with the received signal and to determine the data that was transmitted.

The timing generator 7 of the receiver 11 operates under control of the radio controller and interface 9 to provide a clock signal that is used in the correlation process performed in the UWB waveform correlator 5. Moreover, in the receiver 11, the UWB waveform correlator 5 correlates in time a particular pulse sequence produced at the receiver 11 with the receive pulse sequence that was coupled in through antenna 1 and modified by front end 3. When the two such sequences are aligned with one another, the UWB waveform correlator 5 provides high signal to noise ratio (SNR) data to the radio controller and interface 9 for subsequent processing. In some circumstances, the output of the UWB waveform correlator 5 is the data itself. In other circumstances, the UWB waveform correlator 5 simply provides an intermediate correlation result, which the radio controller and interface 9 uses to determine the data and determine when the receiver 11 is synchronized with the incoming signal.

In some embodiments of the present invention, when synchronization is not achieved (e.g., during a signal acquisition mode of operation), the radio controller and interface 9 provides a control signal to the receiver 11 to acquire synchronization. In this way, a sliding of a correlation window with in the UWB waveform correlator 5 is possible by adjustment of the phase and frequency of the output of the timing generator 7 of the receiver 11 via a control signal from the radio controller and interface 9. The control signal causes the correlation window to slide until lock is achieved. The radio controller and interface 9 is a processor-based unit that is implemented either with hard wired logic, such as in one or more application specific integrated circuits (ASICs) or in one or more programmable processors.

Once synchronized, the receiver 11 provides data to an input port ("RX Data In") of the radio controller and interface 9. An external process, via an output port ("RX Data Out") of the radio controller and interface 9, may then use this data. The external process may be any one of a number of processes performed with data that is either received via the receiver 11 or is to be transmitted via the transmitter 13 to a remote receiver.

During a transmit mode of operation, the radio controller and interface 9 receives source data at an input port ("TX Data In") from an external source. The radio controller and interface 9 then applies the data to an encoder 21 of the transmitter 13 via an output port ("TX Data Out"). In addition, the radio controller and interface 9 provides control signals to the transmitter 13 for use in identifying the signaling sequence of UWB pulses. In some embodiments of the present invention, the receiver 11 and the transmitter 13 functions may use joint resources, such as a common timing generator and/or a common antenna, for example. The encoder 21 receives user coding information and data from the radio controller and interface 9 and preprocesses the data and coding so as to provide a timing input for the UWB waveform generator 17, which produces UWB pulses encoded in shape and/or time to convey the data to a remote location.

The encoder 21 produces the control signals necessary to generate the required modulation. For example, the encoder 21 may take a serial bit stream and encode it with a forward error correction (FEC) algorithm (e.g., such as a Reed Solomon code, a Golay code, a Hamming code, a Convolutional code, etc.). The encoder 21 may also interleave the data to guard against burst errors. The encoder 21 may also apply a whitening function to prevent long strings of "ones" or "zeros." The encoder 21 may also apply a user specific spectrum spreading function, such as generating a predetermined length chipping code that is sent as a group to represent a bit (e.g., inverted for a "one" bit and non-inverted for a "zero" bit, etc.). The encoder 21 may divide the serial bit stream into subsets in order to send multiple bits per wavelet or per chipping code, and generate a plurality of control signals in order to affect any combination of the modulation schemes as described above (and/or as described in *Lathi*).

The radio controller and interface 9 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the ID may be used to apply a different amplitude signal (e.g., of amplitude "f") to a fast modulation control signal to be discussed with respect to FIG. 2, as a way of impressing the encoding onto the signal.

The output from the encoder 21 is applied to a UWB waveform generator 17. The UWB waveform generator 17 produces a UWB pulse sequence of pulse shapes at pulse times according to the command signals it receives, which may be one of any number of different schemes. The output from the UWB generator 17 is then provided to an antenna 15, which then transmits the UWB energy to a receiver.

In one UWB modulation scheme, the data may be encoded by using the relative spacing of transmission pulses (e.g., PPM, chirp, etc.). In other UWB modulation schemes, the data may be encoded by exploiting the shape of the pulses as described above (and/or as described in *Lathi*). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 13, etc. An often even more important quality, however, is the application of such technique to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity with out suffering from interference from one another.

Figure 2:
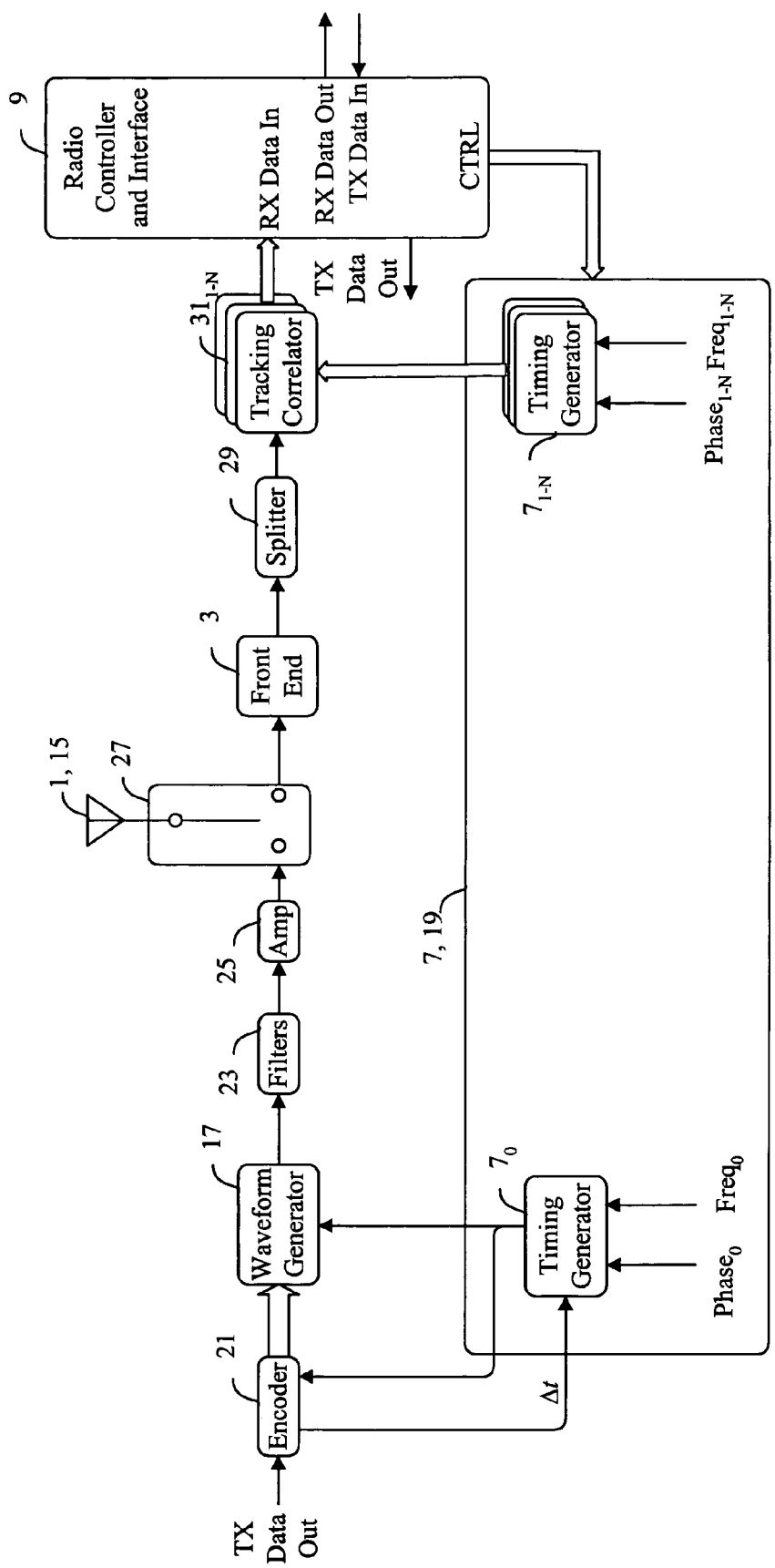
FIG. 2 is a block diagram of the transceiver of FIG. 1a, that manipulates a shape of UWB pulses, according to the present invention.

FIG. 2 is a block diagram of a transceiver embodiment of the present invention in which the modulation scheme employed is able to manipulate the shape and time of the UWB pulses. In FIG. 2, when receiving energy through the antenna 1, 15 (e.g., corresponding antennas 1 and 15 of FIG. 1a) the energy is coupled in to a transmit/receive (T/R) switch 27, which passes the energy to a radio front end 3. The radio front end 3 filters, extracts noise, and adjusts the amplitude of the signal before providing the same to a splitter 29. The splitter 29 divides the signal up into one of N different signals and applies the N different signals to different tracking correlators $31_1$–$31_N$. Each of the tracking correlators $31_1$–$31_N$ receives a clock input signal from a respective timing generator $7_1$–$7_N$ of a timing generator module 7, 19, as shown in FIG. 2.

The timing generators $7_1$–$7_N$, for example, receive a phase and frequency adjustment signal, as shown in FIG. 2, but may also receive a fast modulation signal or other control signal(s) as well. The radio controller and interface 9 provides the control signals, such as phase, frequency and fast modulation signals, etc., to the timing generator module 7, 19, for time synchronization and modulation control. The fast modulation control signal may be used to implement, for example, chirp waveforms, PPM waveforms, such as fast time scale PPM waveforms, etc.

The radio controller and interface 9 also provides control signals to, for example, the encoder 21, the waveform generator 17, the filters 23, the amplifier 25, the T/R switch 27, the front end 3, the tracking correlators $31_1$–$31_N$(corresponding to the UWB waveform correlator 5 of FIG. 1a), etc., for controlling, for example, amplifier gains, signal waveforms, filter passbands and notch functions, alternative demodulation and detecting processes, user codes, spreading codes, cover codes, etc.

During signal acquisition, the radio controller and interface 9 adjusts the phase input of, for example, the timing generator $7_1$, in an attempt for the tracking correlator $31_1$ to identify and the match the timing of the signal produced at the receiver with the timing of the arriving signal. When the received signal and the locally generated signal coincide in time with one another, the radio controller and interface 9 senses the high signal strength or high SNR and begins to track, so that the receiver is synchronized with the received signal.

Once synchronized, the receiver will operate in a tracking mode, where the timing generator $7_1$ is adjusted by way of a continuing series of phase adjustments to counteract any differences in timing of the timing generator $7_1$ and the incoming signal. However, a feature of the present invention is that by sensing the mean of the phase adjustments over a known period of time, the radio controller and interface 9 adjusts the frequency of the timing generator $7_1$ so that the mean of the phase adjustments becomes zero. The frequency is adjusted in this instance because it is clear from the pattern of phase adjustments that there is a frequency offset between the timing generator $7_1$ and the clocking of the received signal. Similar operations may be performed on timing generators $7_2$–$7_N$, so that each receiver can recover the signal delayed by different amounts, such as the delays caused by multipath (i.e., scattering along different paths via reflecting off of local objects).

A feature of the transceiver in FIG. 2 is that it includes a plurality of tracking correlators $31_1$–$31_N$. By providing a plurality of tracking correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 9 receives the information from the different tracking correlators $31_1$–$31_N$ and decodes the data. The radio controller and interface 9 also provides control signals for controlling the front end 3, e.g., such as gain, filter selection, filter adaptation, etc., and adjusting the synchronization and tracking operations by way of the timing generator module 7, 19.

In addition, the radio controller and interface 9 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 2, a timing generator $7_0$ also receives phase, frequency and/or fast modulation adjustment signals for use in encoding a UWB waveform from the radio controller and interface 9. Data and user codes (via a control signal) are provided to the encoder 21, which in the case of an embodiment of the present invention utilizing time-modulation, passes command signals (e.g., $\Delta t$) to the timing generator $7_0$ for providing the time at which to send a pulse. In this way, encoding of the data into the transmitted waveform may be performed.

When the shape of the different pulses are modulated according to the data and/or codes, the encoder 21 produces the command signals as a way to select different shapes for generating particular waveforms in the waveform generator 17. For example, the data may be grouped in multiple data bits per channel symbol. The waveform generator 17 then produces the requested waveform at a particular time as indicated by the timing generator $7_0$. The output of the waveform generator is then filtered in filter 23 and amplified in amplifier 25 before being transmitted via antenna 1, 15 by way of the T/R switch 27.

In another embodiment of the present invention, the transmit power is set low enough that the transmitter and receiver are simply alternately powered down with out need for the T/R switch 27. Also, in some embodiments of the present invention, neither the filter 23 nor the amplifier 25 is needed, because the desired power level and spectrum is directly useable from the waveform generator 17. In addition, the filters 23 and the amplifier 25 may be included in the waveform generator 17 depending on the implementation of the present invention.

A feature of the UWB communications system disclosed, is that the transmitted waveform x(t) can be made to have a nearly continuous power flow, for example, by using a high chipping rate, where the wavelets g(t) are placed nearly back-to-back. This configuration allows the system to operate at low peak voltages, yet produce ample average transmit power to operate effectively. As a result, sub-micron geometry CMOS switches, for example, running at one-volt levels, can be used to directly drive antenna 1, 15, such that the amplifier 25 is not required. In this way, the entire radio can be integrated on a single monolithic integrated circuit.

Under certain operating conditions, the system can be operated with out the filters 23. If, however, the system is to be operated, for example, with another radio system, the filters 23 can be used to provide a notch function to limit interference with other radio systems. In this way, the system can operate simultaneously with other radio systems, providing advantages over conventional devices that use avalanching type devices connected straight to an antenna, such that it is difficult to include filters therein.

Figure 3:
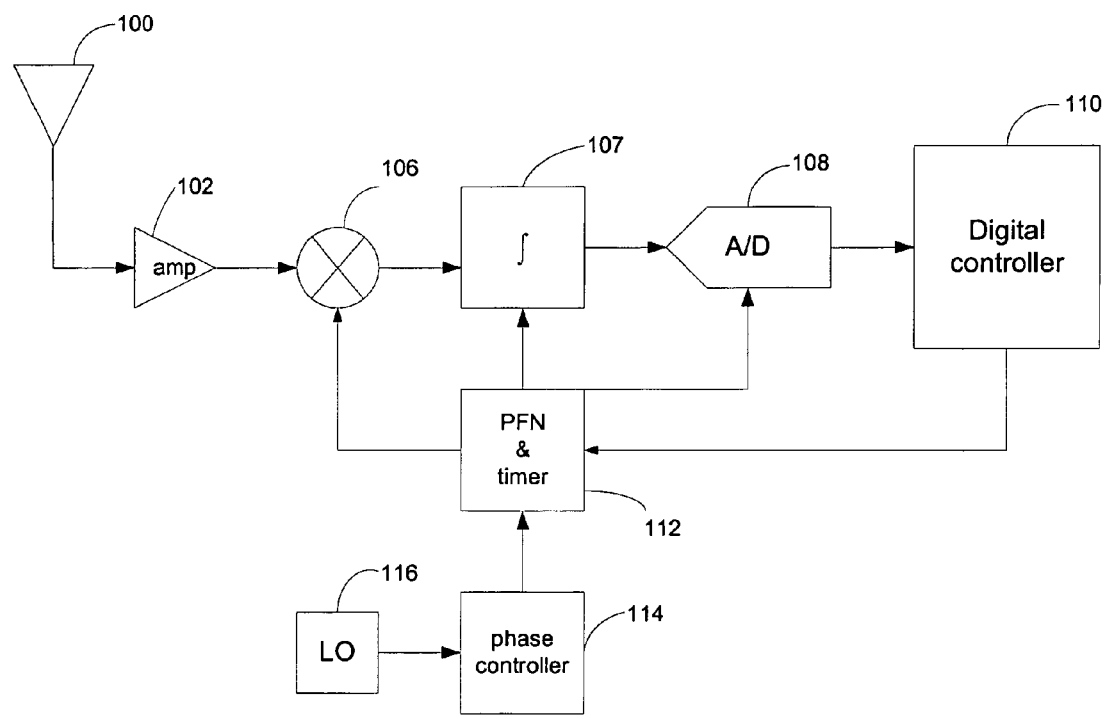
FIG. 3 is a block diagram of an exemplary UWB receiver according to the present invention.

FIG. 3 is a block diagram of an exemplary UWB receiver according to the present invention. In this example, amplifier 102 is disposed in the front end 3 of FIG. 1. Mixer 106, integrator 107, and pulse forming network (PFN) 112 and timer are disposed in UWB waveform correlator 5 of FIG. 1. Local oscillator 116 and phase controller 114 are disposed in the timing generator 7 of FIG. 1. Analog to Digital (A/D) converter 108 and digital controller 110 may be included in radio controller and interface 9 of FIG. 1. In an exemplary UWB receiver of the present invention, an electromagnetic signal is transmitted over a radio channel to be received in the UWB receiver at antenna 100 (1, 15 in FIG. 1. After passing through antenna 100, the signal is amplified at amplifier 102. Optional filtering and signal adjustment such as AGC may be implemented in this portion of the receiver. At PFN 112, a series of local pulses (e.g., square pulses or perhaps wavelets) are generated and multiplied with the incoming signal at mixer 106. Integrator 107 accumulates the mixer output over a predetermined period. The output is sampled at A/D converter 108 at a rate that corresponds to a source bit rate, such that there are a predetermined number of samples per bit, such as one sample per bit. The output of A/D converter 108 is provided to digital controller 110, where synchronization mode control is performed. The digital controller sends a control signal back to phase controller 114 as part of the mode control process. The phase controller 114 acts in conjunction with local oscillator 116 to adjust the phase of the local pulse mixed with the incoming signal in mixer 106. PFN 112 sends a reset command to integrator 107 for each bit (if that is the selected accumulate period). PFN 112 also sends a clock command to A/D converter 108 to sample the output of integrator 107.

With regard to synchronization the receiver operates in one of at least two operating modes: acquisition and tracking/detection. When the receiver is already locked to the incoming signal, the receiver is in tracking/detection mode. When signal integrity significantly degrades, the receiver goes to acquisition mode to reacquire the signal. In acquisition, an incoming UWB signal is received through antenna 100. Locally, PFN 112 generates a string of pulses, corresponding in sequence to a code applied to the transmitted signal, to mix with the incoming signal at mixer 106. There is maximum correlation out of integrator 107 when the two input signals are perfectly phase aligned. Initially, it is not known whether the two signals are lined up with each other. The local pulse stream created in PFN 112 may be positioned between the pulses of the incoming signal. In this case, the output of integrator 107 would be small. To achieve the maximum correlation, the phase of the clock attached to PFN 112 is controlled by the phase controller 114 to generate a pulse stream that is matched in time with the incoming signal at mixer 106. If the output from integrator 107 is below a predetermined threshold, digital controller 110 sends a signal to phase controller 114 to adjust the phase of the generated local pulse stream. To do this, the phase of oscillator 116 is adjusted repeatedly to shift the pulse stream in phase with the incoming signal. As such, the local pulse stream slides in phase until it is aligned in time with the incoming signal at mixer 106, hence, obtaining maximum correlation. The point at which maximum correlation occurs is determined by any of a variety of acquisition routines, as will be discussed.

When a correlation peak is observed, or at least with in a predetermined distance from the correlation peak, the digital controller switches to have the receiver operate in a tracking mode. At this point, what is needed is a way to monitor the SNR of the incoming signal to determine if an acceptable quality of service (e.g., data rate at a BER) is maintained, by monitoring the pattern of signal sample points, at the output of A/D converter 108.

In the present embodiment, A/D converter 108 is set to a sampling rate equal to the bit rate, thus providing one sample per data bit. Each of these samples has a data bit width of 3 to 8 bits, depending on the implementation of A/D converter 108. Accordingly, an incoming bit is a sample point with a noise-free value of either A or −A, where A is the signal amplitude. An amplitude A indicates an incoming signal "1". And, an amplitude −A indicates an incoming signal "0" (represented by "−1"). Due to noise in the incoming signal, the bit pattern varies around amplitudes A and −A. Signal power may be expressed as the square of the mean of the absolute value of the bit pattern, which corresponds with the amplitude of the UWB signal. Noise power is given by the variance around that mean. The question is how does one measure the SNR to make sure that the signal has sufficient SNR.

In the present invention, the incoming signal is a biphase signal, i.e., it communicates with inverted and non-inverted channel symbols. The BER is ideally given by a function $Q(A/\sigma)$, where A is the signal amplitude and $-\sigma$ is the noise standard deviation. As an example, the BER may be set to $10^{-2}$ such that one error in 100 incoming bits is allowed, and the system will remain in tracking/detection mode. For biphase modulation, the BER is related to the SNR. Recognizing this, the present inventors implemented a mechanism and process to estimate SNR such that the preferred mode of operation, i.e. acquisition or tracking, could be determined with certainty. For this system, let a received sample be $x_i = b_i A + \sigma n_i$, where $b_i$ is the bit value, $b_i \in \{-1,1\}$, A is the amplitude of the signal, and $n_i$ is zero-mean, unit variance, white-Gaussian noise. If $A/\sigma$ is greater than 2.3, then the statistical properties of $|x_i|$ are approximately the same as the statistical properties of $A+\sigma n_i$. Then a reasonable approximation of the absolute value is $$|x_i| = A + \sigma n_i \quad (7)$$

Figure 4A:
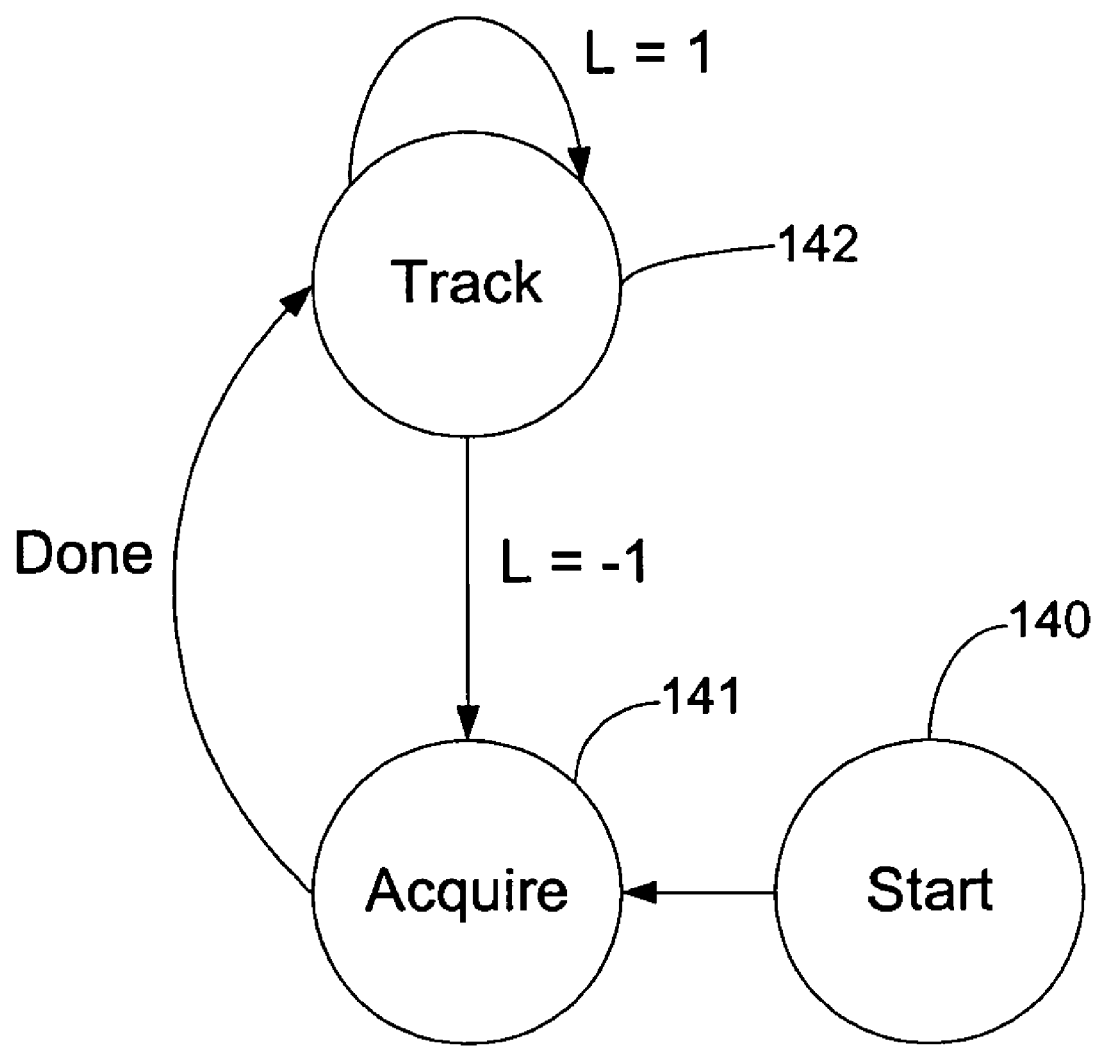
FIG. 4A is a state diagram of a mode controller according to the present invention.

A mode controller of the present invention implements finite state machines. FIG. 4A is a state diagram of the mode controller of the present invention. State 141 is an acquire state machine for acquiring the incoming signal during acquisition mode. State 142 is a track state machine for tracking the incoming signal during the tracking/detection mode of operation. The value of L drives the mode controller by determining when the mode controller should transition between states and in which mode the receiver should operate. The mode controller starts in initial state 140. The signal is then acquired by an acquire state machine in state 141. After acquisition, the mode controller transitions to the track state 142 where the signal is tracked by a track state machine. If L=1, i.e. SNR is sufficient, the mode controller stays in state 142. If, however, L=−1, then the mode controller transitions back to the acquire state 141 to re-acquire the signal and the process repeats.

Figure 4B:
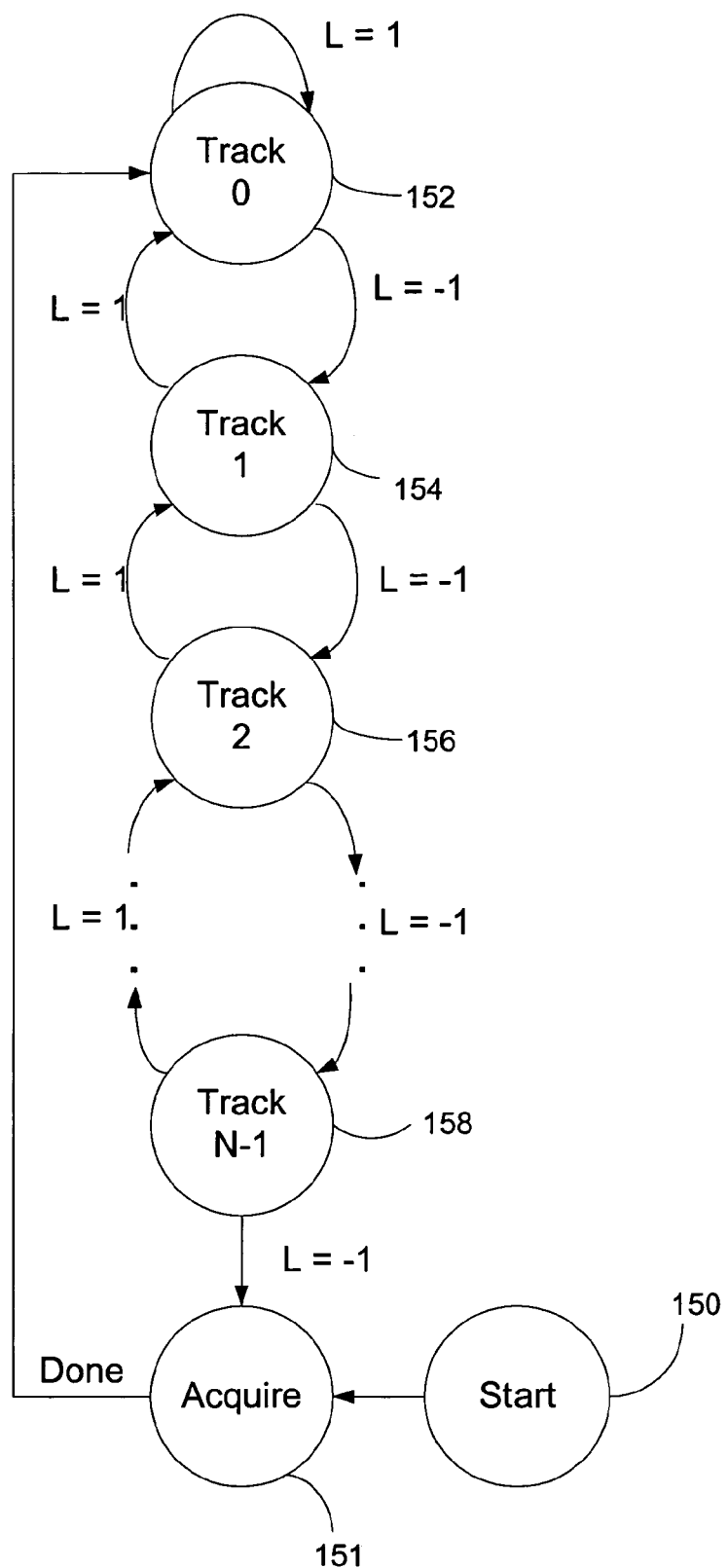
FIG. 4B is a state diagram of a mode controller according to the present invention with multiple track states.

The mode controller can include multiple track states, as shown in FIG. 4B. Similar to the mode controller of FIG. 4A, the mode controller starts in initial state 150, then acquires the signal in acquire state 151. After acquisition, the mode controller goes to track state 152, where L is calculated. If L=1, the mode controller stays in state 152; otherwise, L= −1 and the mode controller transitions down to state 154. If the mode controller continues to compute L=−1, the mode controller transitions down through states 156 and 158. The mode controller includes N track states 152–158. State 152 is the initial track state and states 154–158 are intermediate states. When in these intermediate states, the receiver is still in tracking/detection mode. However, if L=−1 at state N−1, the mode controller transitions out of state 158 and goes into acquire state 151. At this point, the mode controller directs the receiver to reacquire the signal. After acquisition, the mode controller passes control back to initial track state 152. The process then starts over.

The function of the intermediate states is to prevent the receiver from jumping immediately to reacquire if the receiver receives a burst of noise. The mode controller is built to increase the steepness of the radio performance curves and ensure that accidental signal unlocks do not occur. Hence, it takes longer to become unlocked and the curve steepens. These intermediate states allow the receiver to tolerate intermittent bit errors with out going into the acquire state. The amount of time it takes to unlock can be adjusted by increasing or reducing the number of intermediate states. This function is especially useful when there are burst errors. These burst errors cause short periods of increased bit errors. However, if the signal is easily unlocked, these intermittent burst errors could cause the signal to go into frequent reacquisition and the system throughput would thus decrease. The mode controllers of FIGS. 4A and 4B may be implemented in a programmable processor such as an ASIC, for example.

Figure 5:
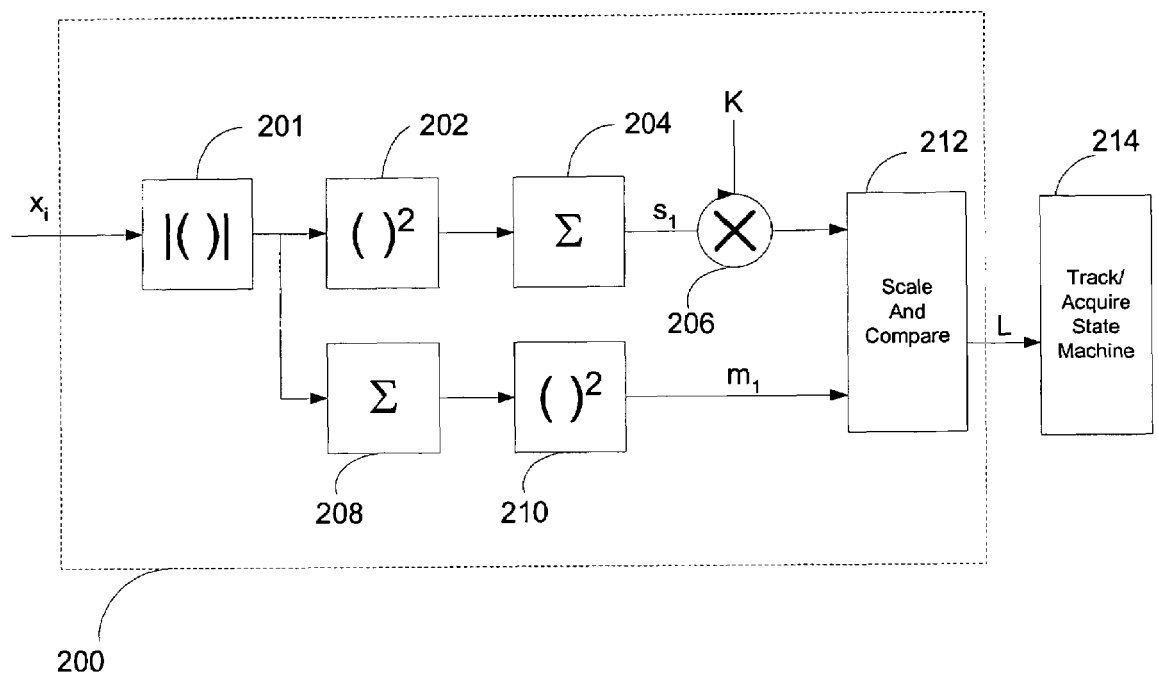
FIG. 5 is a block diagram of one embodiment of the mode controller according to the present invention that estimates signal and noise power.

FIG. 5 shows one embodiment of the present invention in which a mode controller determines whether the receiver should be in acquisition or tracking/detection mode based on the estimation of signal and noise power. This determination begins with a calculation of two parameters, $m_1$ and $s_1$. Equation 8 shows the calculation of $m_1$, where samples $x_i$ are summed over a set of B bits in the incoming signal and then squared. $m_1$ is proportional to an estimate (or measure) of signal power. Similarly, Equation 9 shows the calculation of $s_1$, where the square of $x_i$ is summed over the set of B bits. $s_1$ is related to noise power.

$$m_1 = \left(\sum_{i=1}^{B} |x_i|\right)^2 \tag{8}$$

$$s_1 = \sum_{i=1}^{B} x_i^2 \tag{9}$$

Lock parameter L is a determination of whether a signal meets a SNR requirement. A lock constant K influences the probability of L being 1, i.e. the threshold that the signal must meet. Thus, for an acceptable SNR $m_1$ should be greater than $s_1$ by a factor equal to lock constant K. As such the present process compares $m_1$ and $s_1$ in Equation 10. If signal power is sufficiently greater than noise power, then L=1 indicates sufficient SNR. Conversely, if signal power is less than or equal to noise power multiplied by K, then L=−1, indicating insufficient SNR.

$$L = \text{sign}(m_1 - Ks_1) \tag{10}$$

Here, $m_1$ and $s_1$ are random variables. Equations 11–13 show the expected values of $m_1$, $s_1$ and $m_1 - Ks_1$, where $|x_i|$ from Equation 7 is substituted in Equations 8 and 9 and the expected values taken.

$$E(m_1) = E\left[\left\{\sum_{i=1}^{B}(A + n_i\sigma)\right\}^2\right] \tag{11}$$

$$= E\left[B^2A^2 + \sigma^2\sum_{i=1}^{B}n_i^2 + 2BA\sigma\sum_{i=1}^{B}n_i\right]$$

$$= B^2A^2 + B\sigma^2$$

Since, $n_i$ is zero mean and unit variance, $E[(\Sigma n_i)^2] = B$ and $E[\Sigma n_i] = 0$.

$$E(s_1) = E\left[\sum_{i=1}^{B}(A + n_i\sigma)^2\right] \tag{12}$$

$$= E\left[BA^2 + \sigma^2\sum_{i=1}^{B}n_i^2 + 2A\sigma\sum_{i=1}^{B}n_i\right]$$

$$= BA^2 + B\sigma^2$$

Similarly, the $n_i$ terms simplify. Then, $$E(m_1 - Ks_1) = B^2A^2 + B\sigma^2 - KBA^2 - KB\sigma^2 \tag{13}$$

$$= BA^2(B - K) - B\sigma^2(K - 1)$$

To ensure that L=1 most of the time, $E(m_1 - Ks_1) > 0$. Equivalently, $$\frac{A^2}{\sigma^2} > \frac{K-1}{B-K} \tag{14}$$

Since the BER is a function of SNR, the mode controller adjusts the BER threshold at which to enter an acquisition state by changing the value of K in Equation 14. It is this mathematical analysis that provides the impetus for the mode control process and mechanism, since it enables a low cost, highly reliable implementation.

FIG. 5 shows a block diagram of one embodiment of the mode controller of the present invention. Here, track state machine 200 of a track state in FIG. 4A is described. In process block 201, the absolute value of the incoming sampled data stream $x_i$ is determined. $|x_i|$ is then used in parallel calculations to determine $s_1$ and $m_1$. $s_1$ is determined by squaring $|x_i|$ and summing the squares in blocks 202 and 204 respectively. At block 206, the output is multiplied by constant K. K is initially set to correspond to a desired BER. At block 208, $|x_i|$ is summed over some predetermined number of samples. The output is then squared in block 210 to produce parameter $m_1$.

At processing block 212, the estimates of $m_1$ and $Ks_1$ are compared to determine the probability of the incoming signal being locked. This comparison yields the lock parameter L. L is input to adjacent track or acquire state machine 214 of an adjacent state. As shown in FIG. 4B, the output from a track state machine may transition to another track state machine or, in the case of the state machine of the last intermediate state, to an acquire state machine. The output of state machine 200 is L, the determination of whether the signal should be reacquired or whether the signal continues to be tracked. A direct computation of the ratio in Equation 14 is therefore not required since Equation 14 is only used to set the value of K.

Figure 6:
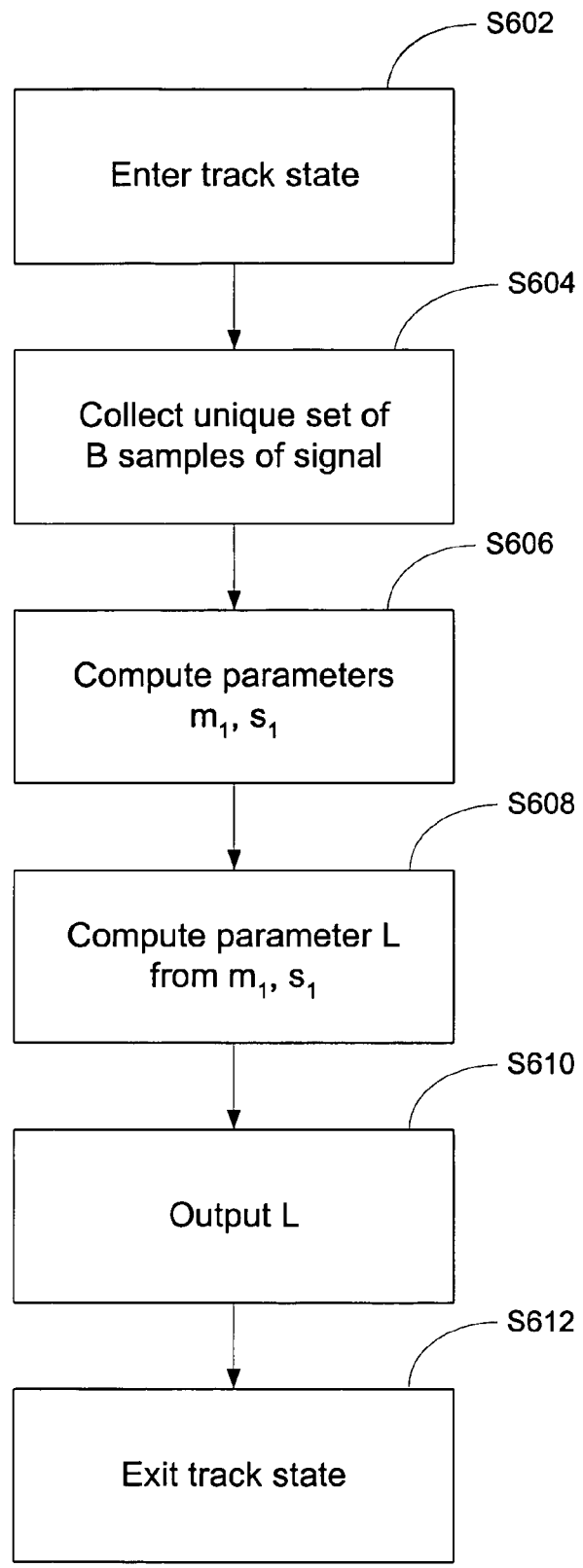
FIG. 6 is a flow chart of a process performed by the mode controller of FIG. 5.

FIG. 6 shows the steps performed by the track state machines of the mode controller embodiment of FIG. 5. In step S602, the mode controller enters a track state. The track state machine then performs the following steps. In step S604, the set of bits B in the incoming signal is collected. Using this set of B samples, the state machine computes parameters $m_1$ and $s_1$ in step S606. Based on $m_1$ and $s_1$, lock parameter L is calculated in step S608. The value of L is output in step S610. The lock parameter L indicates the probability that the set of B samples is at a sufficient SNR to avoid the desire to switch back to the acquisition state. In step S612, the mode controller exits the track state. If the next state into which the mode controller transitions is a track state, then the next track state performs the steps S602–S612.

Figure 7:
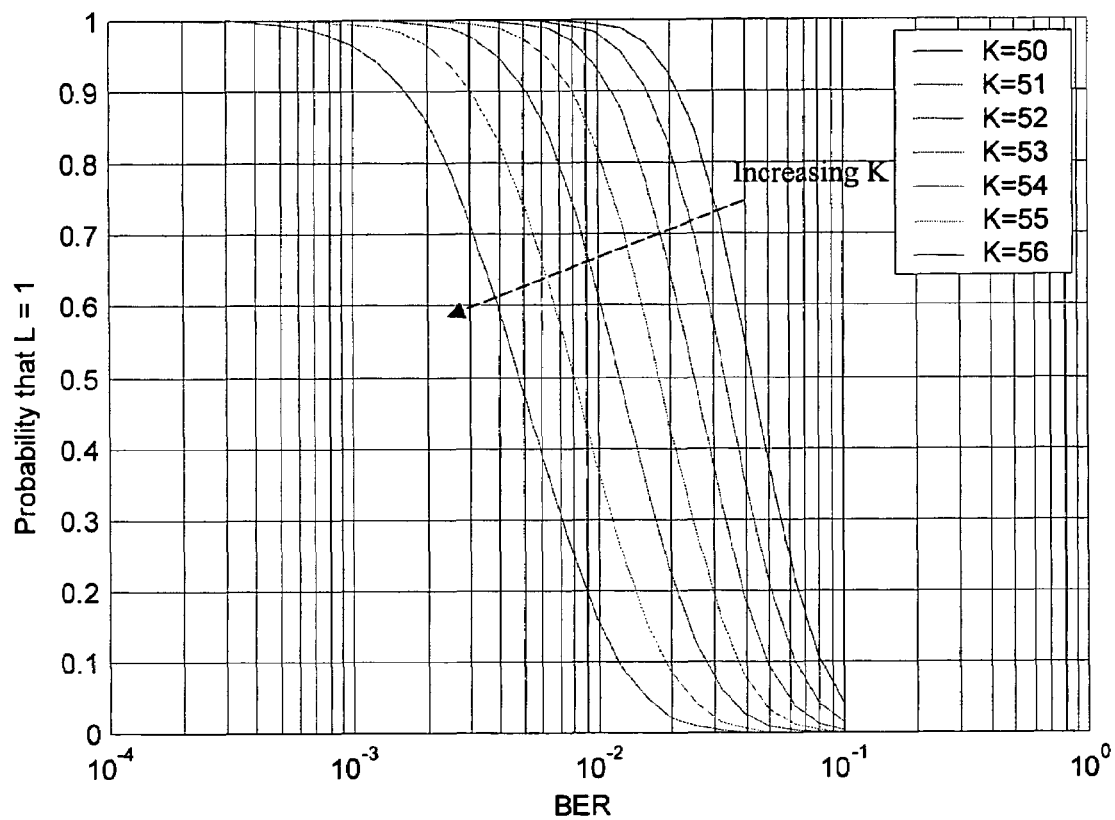
FIG. 7 is a graph that shows the probability that lock parameter L=1 as a function of bit error rate (BER) for various values of lock constant K.

FIG. 7 is a graph that shows the behavior of the probability curves for various values of K. From these curves, it is clear that larger values of K drive L to −1 at lower BER's. As previously stated, the BER in this exemplary embodiment is set to $10^{-2}$. This means that for every 100 incoming bits 1 error is allowed. If the BER reaches or gets larger than $10^{-2}$, then the mode controller directs the receiver to and acquire a new signal. Since acquisition is "expensive" in terms of lost system throughput, K is chosen so that the probability that L=1 at $10^{-2}$ BER is high. For the present embodiment, K=50.

Figure 8:
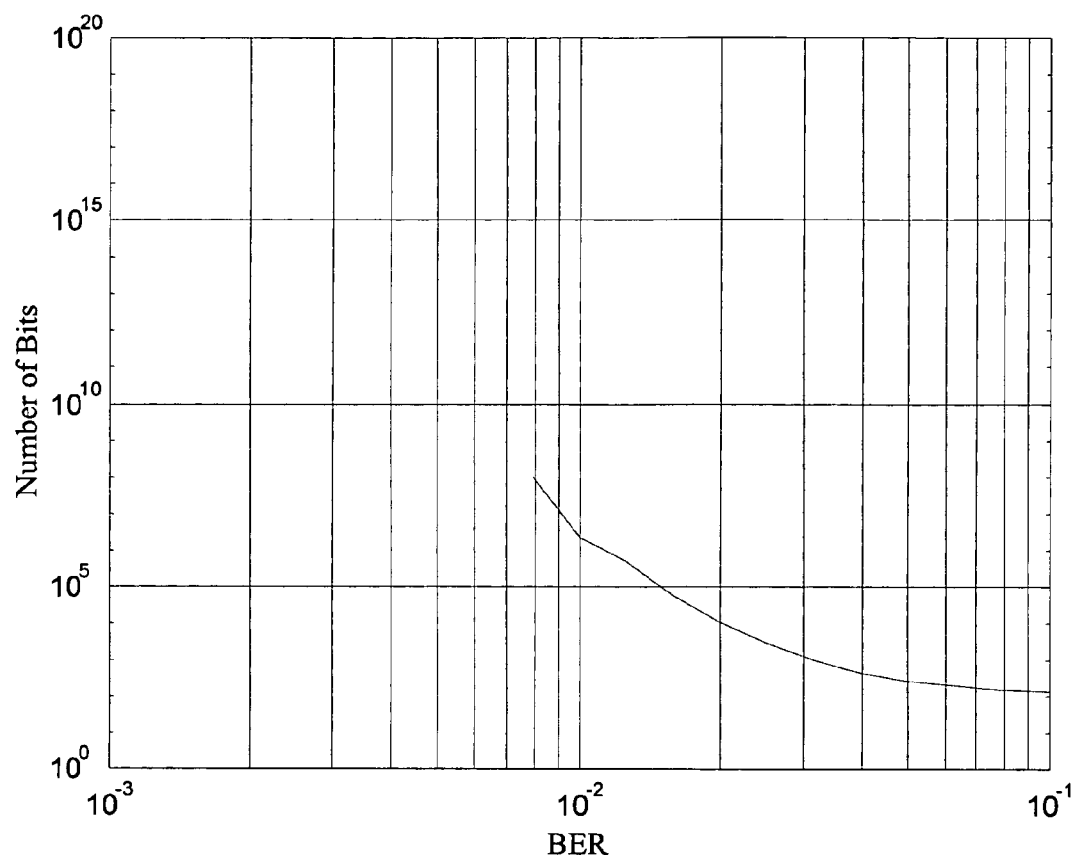
FIG. 8 is a BER vs. number of bits to unlock graph of the mode controller performance with lock constant K=50.

FIG. 8 shows the performance curve of the mode controller of the present invention at K=50. This curve was generated by computing the probability of arriving at the acquire state for K=50. From the curve, it is shown that at a BER of $10^{-2}$, the system will unlock with in 10 million bits. The curve increases dramatically such that at a BER of $10^{-3}$, the system stays locked indefinitely.

Figure 9:
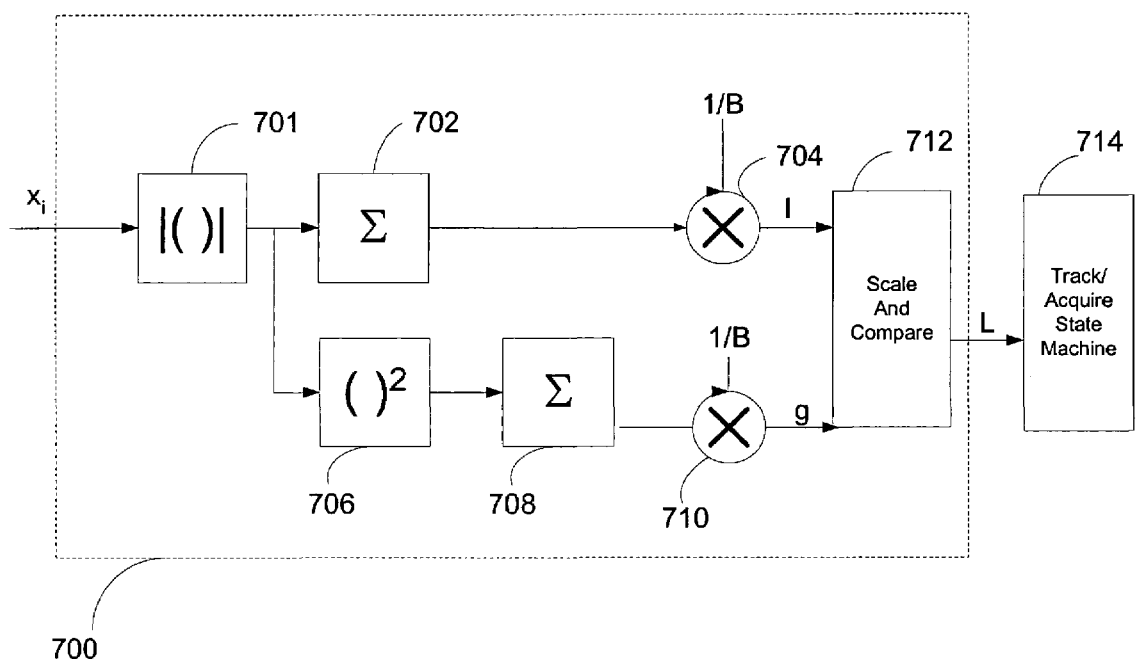
FIG. 9 is a block diagram of another embodiment of the present invention in which the mode controller directly calculates SNR.

FIG. 9 shows another embodiment of the mode controller according to the present invention. Here, track state machine 700 of a track state machine in FIGS. 4A and 4B is described. In this embodiment, the SNR is calculated by computing two parameters 1 and g. Equation 15 explains how the expected value of 1 may be calculated. And Equation 16 explains how the expected value of g may be calculated.

$$l = \frac{1}{B}\sum_{i=1}^{B} |x_i| \tag{15}$$

$$E(l) = E\left[\frac{1}{B}\sum_{i=1}^{B} |x_i|\right]$$

$$= E\left[A + \frac{1}{B}\sigma\sum_{i=1}^{B} n_i\right] = A$$

$$g = \frac{1}{B}\sum_{i=1}^{B} |x_i|^2 \tag{16}$$

$$E(g) = E\left[\frac{1}{B}\sum_{i=1}^{B} |x_i|^2\right]$$

$$= E\left[A^2 + \frac{1}{B}2A\sigma\sum_{i=1}^{B} n_i + \frac{1}{B}\sigma^2\sum_{i=1}^{B} n_i^2\right] = A^2 + \sigma^2$$

$1^2$ estimates signal power. $g-1^2$ estimates noise power. Then, by definition, Equation 17 shows the direct estimate of SNR.

$$\frac{l^2}{g-l^2} \approx \frac{A^2}{A^2+\sigma^2-A^2} = \frac{A^2}{\sigma^2} \tag{17}$$

Since BER is a function of SNR, as previously stated, the SNR corresponding to the desired BER can be determined and monitored. When the SNR goes below a target level $T_h$, the mode controller can detect an unlock status with lock parameter L. As such, the present invention compares the SNR to the target level in Equation 18.

$$L = \begin{cases} 1, & \text{for } \frac{l^2}{g-l^2} \geq T_h \\ -1, & \text{for } \frac{l^2}{g-l^2} < T_h \end{cases} \tag{18}$$

In block 701 of track state machine 700, the absolute value of the incoming bit stream $x_i$ is calculated. To determine 1, the signal is summed in block 702 then multiplied by 1/B in block 704. g is determined by squaring $x_i$ in block 706 and summing the squares in block 708. That output is then multiplied by 1/B in block 710. In block 712, 1 and g are compared to determine the lock parameter L. L is used to transition into track or acquire state machine 714. Again, as shown in FIG. 4B, the output from a track state machine may go to another track state machine or, in the case of the state machine of the last intermediate state, to an acquire state machine.

Figure 10:
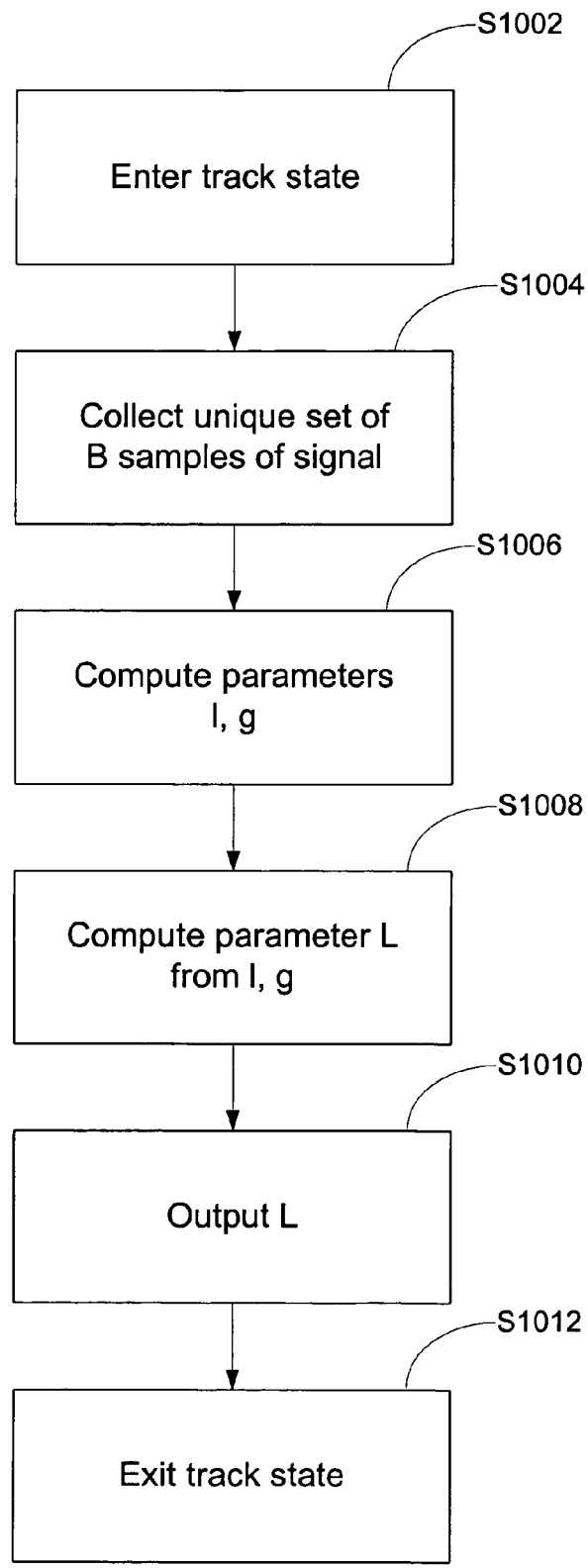
FIG. 10 is a flow chart of a process performed by the mode controller of FIG. 9.

FIG. 10 shows the steps performed by the track state machines of the mode controller embodiment of FIG. 9. The steps are similar to those in FIG. 6 with the exception of the parameters that are calculated in step S1006. Here parameters l and g are calculated to determine if the mode controller should track or acquire the incoming UWB signal.

Figure 11:
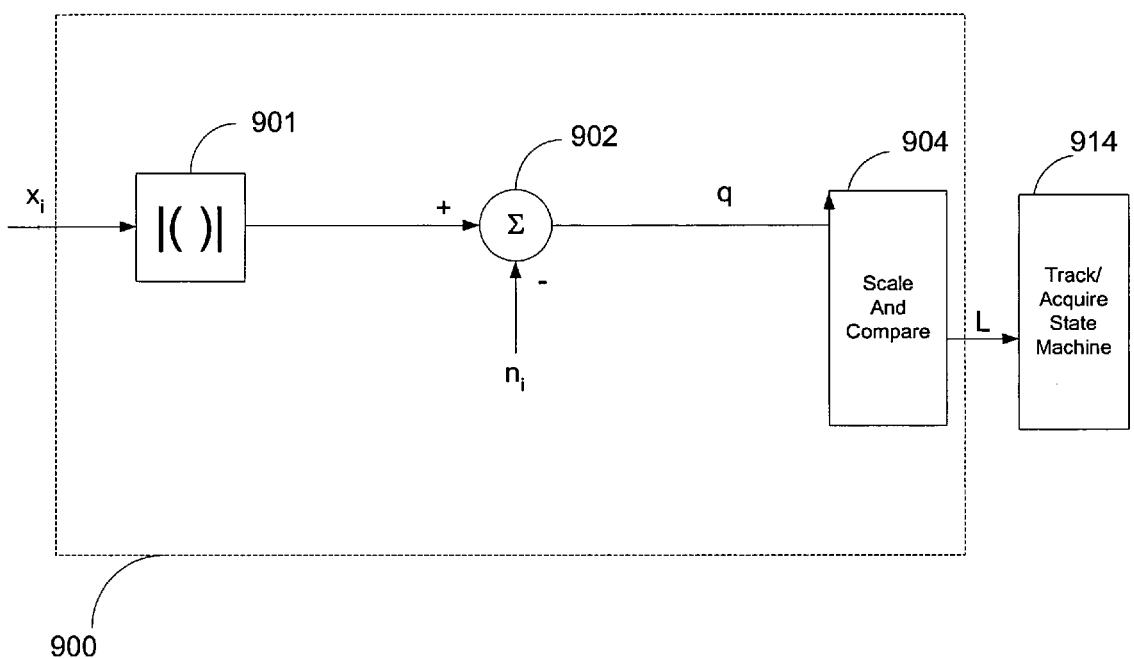
FIG. 11 is a block diagram of still another embodiment of the present invention that uses AGC initialization in the mode controller.

FIG. 11 shows a third embodiment of the present invention in which AGC initialization is used to determine whether the mode controller should be in acquisition or tracking/detection mode. During AGC initialization, noise variance is estimated. If AGC is initialized by measuring the noise variance, then quantization levels may potentially translate directly to BERs. For example, if the noise variance is set to some arbitrary value through AGC control, then the amplitude of the incoming signal out of the A/D converter implies a SNR similar to that amplitude. This value translates directly into a BER. So, by setting the noise variance prior to signal acquisition, the quantized levels translate directly into a BER. As a result, the noise variance is constantly estimated by just monitoring the spread of samples of the incoming signal out of the A/D converter. Then, the mode controller simply monitors the A/D output. If the output falls below some given target level $T_a$, then the signal is said to be unlocked, which in turn drives the state machine. As such, the present embodiment compares the amplitude to the target level in Equation 19.

$$L = \begin{cases} 1, & \text{for } q \geq T_a \\ -1, & \text{for } q < T_a \end{cases} \quad (19)$$

In processing block 901 of track state machine 900, the absolute value of the incoming signal is taken. At block 902, the estimated noise of the incoming signal called $\hat{n}_i$ is subtracted from the absolute value of the incoming signal to estimate the amplitude, $g_i$. This amplitude in block 904, is compared against a target to calculate the lock parameter L. L is input to track or acquire state machine 906 in which transition to either a track or acquire state is determined based on that L value. As shown in FIG. 4B, the output from a track state machine may go to another track state machine or, in the case of the state machine of the last intermediate state, to an acquire state machine.

If the initial noise variance estimate is underestimated, then the SNR would appear to be better than it actually is. On the other hand, if the initial estimate is overestimated, then the SNR would appear to be worse than it actually is. But an interesting feature about this embodiment is that the estimate can continue to be updated. So eventually, the estimate will converge to a reasonable value.

Figure 12:
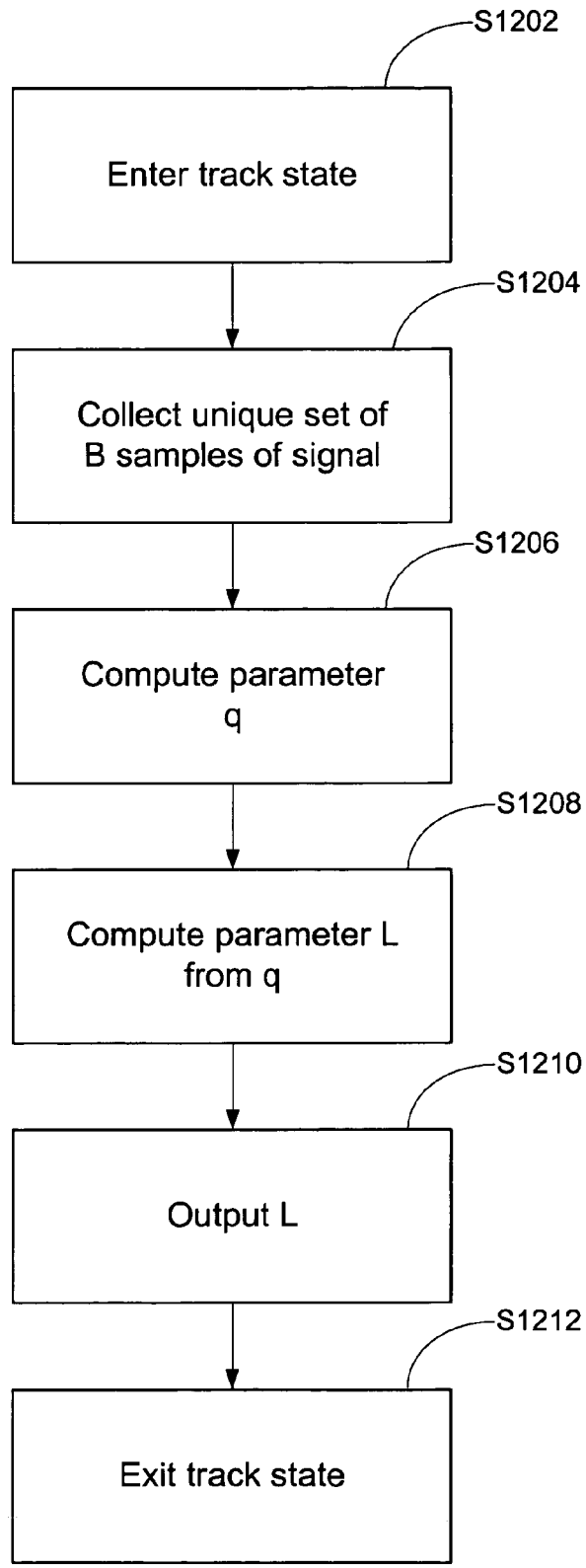
FIG. 12 is a flow chart of a process performed by the mode controller of FIG. 11.

FIG. 12 outlines the steps performed by the track state machines of the mode controller embodiment of FIG. 11. Similar to the previous embodiments of FIGS. 6 and 10, the exception is the parameter computed in step S1206. Here, the amplitude g is estimated. The amplitude is then used to determine lock parameter L.

The UWB transceiver of FIGS. 1a, 1b, and 2 may be used to perform a radio transport function for interfacing with different applications as part of a stacked protocol architecture. In such a configuration, the UWB transceiver performs signal creation, transmission and reception functions as a communications service to applications that send data to the transceiver and receive data from the transceiver much like a wired I/O port. Moreover, the UWB transceiver may be used to provide a wireless communications function to any one of a variety of devices that may include interconnection to other devices either by way of wired technology or wireless technology. Thus, the UWB transceiver of FIG. 1a may be used as part of a local area network (LAN) connecting fixed structures or as part of a wireless personal area network (WPAN) connecting mobile devices, for example. In any such implementation, all or a portion of the present invention may be conveniently implemented in a microprocessor system using conventional general purpose microprocessors programmed according to the teachings of the present invention, as will be apparent to those skilled in the microprocessor systems art. Appropriate software can be readily prepared by programmers of ordinary skill based on the teachings of the present disclosure, as will be apparent to those skilled in the software art.

Figure 13:
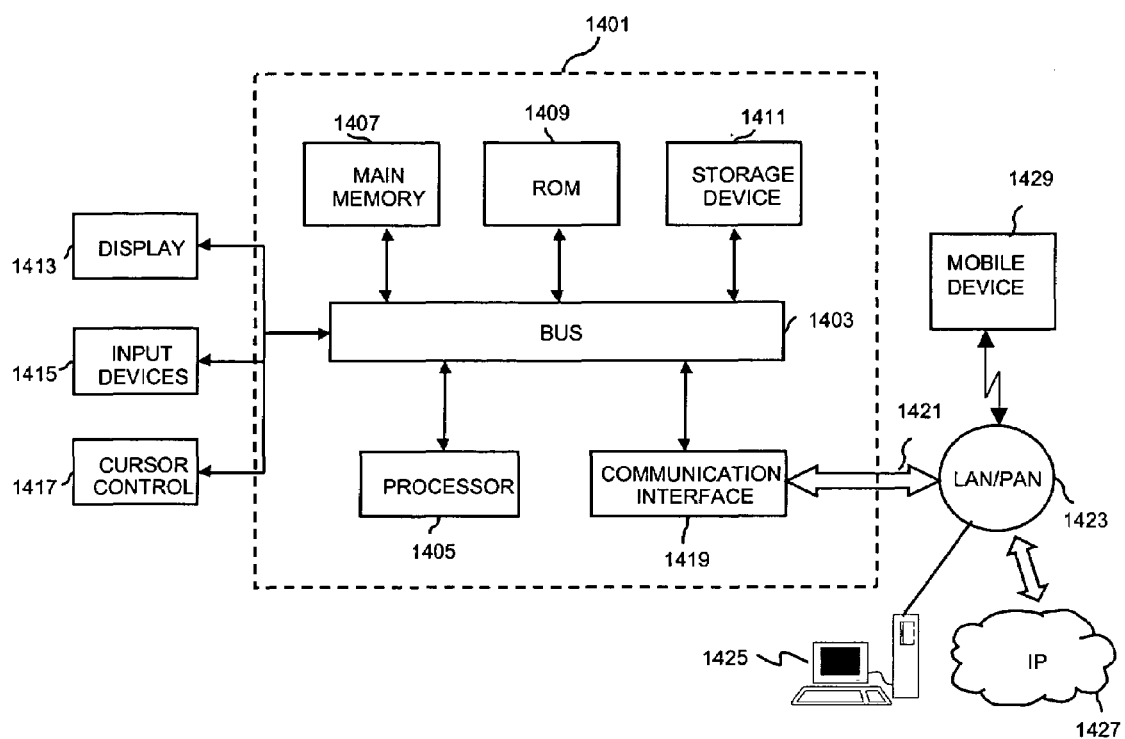
FIG. 13 shows a processor system in which an embodiment of the present invention may be used.

FIG. 13 illustrates a processor system 1401 upon which an embodiment according to the present invention may be implemented. The system 1401 includes a bus 1403 or other communication mechanism for communicating information, and a processor 1405 coupled with the bus 1403 for processing the information. The processor system 1401 also includes a main memory 1407, such as a random access memory (RAM) or other dynamic storage device (e.g., dynamic RAM (DRAM), static RAM (SRAM), synchronous DRAM (SDRAM), flash RAM), coupled to the bus 1403 for storing information and instructions to be executed by the processor 1405. In addition, a main memory 1407 may be used for storing temporary variables or other intermediate information during execution of instructions to be executed by the processor 1405. The system 1401 further includes a read only memory (ROM) 1409 or other static storage device (e.g., programmable ROM (PROM), erasable PROM (EPROM), and electrically erasable PROM (EEPROM)) coupled to the bus 1403 for storing static information and instructions for the processor 1405. A storage device 1411, such as a magnetic disk or optical disc, is provided and coupled to the bus 1403 for storing information and instructions.

The processor system 1401 may also include special purpose logic devices (e.g., application specific integrated circuits (ASICs)) or configurable logic devices (e.g, simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives, may be added to the system 301 using an appropriate device bus (e.g., a small system interface (SCSI) bus, an enhanced integrated device electronics (IDE) bus, or an ultra-direct memory access (DMA) bus). The system 1401 may additionally include a compact disc reader, a compact disc reader-writer unit, or a compact disc jukebox, each of which may be connected to the same device bus or another device bus.

The processor system 1401 may be coupled via the bus 1403 to a display 1413, such as a cathode ray tube (CRT) or liquid crystal display (LCD) or the like, for displaying information to a system user. The display 1413 may be controlled by a display or graphics card. The processor system 1401 includes input devices, such as a keyboard or keypad 1415 and a cursor control 1417, for communicating information and command selections to the processor 1405. The cursor control 1417, for example, is a mouse, a trackball, or cursor direction keys for communicating direction information and command selections to the processor 1405 and for controlling cursor movement on the display 1413. In addition, a printer may provide printed listings of the data structures or any other data stored and/or generated by the processor system 1401.

The processor system 1401 performs a portion or all of the processing steps of the invention in response to the processor 1405 executing one or more sequences of one or more instructions contained in a memory, such as the main memory 1407. Such instructions may be read into the main memory 1407 from another computer-readable medium, such as a storage device 1411. One or more processors in a multi-processing arrangement may also be employed to execute the sequences of instructions contained in the main memory 1407. In alternative embodiments, hard-wired circuitry may be used in place of or in combination with software instructions. Thus, embodiments are not limited to any specific combination of hardware circuitry and software.

As stated above, the processor system 1401 includes at least one computer readable medium or memory programmed according to the teachings of the invention and for containing data structures, tables, records, or other data described herein. Stored on any one or on a combination of computer readable media, the present invention includes software for controlling the system 1401, for driving a device or devices for implementing the invention, and for enabling the system 1401 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 1405 for execution. A computer readable medium may take many forms, including but not limited to, non-volatile media, volatile media, and transmission media. Non-volatile media includes, for example, optical, magnetic disks, and magneto-optical disks, such as the storage device 1411. Volatile media includes dynamic memory, such as the main memory 1407. Transmission media includes coaxial cables, copper wire and fiber optics, including the wires that comprise the bus 1403. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 1405 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 1401 may receive the data on the telephone line and use an infrared transmitter to convert the data to an infrared signal. An infrared detector coupled to the bus 1403 can receive the data carried in the infrared signal and place the data on the bus 1403. The bus 1403 carries the data to the main memory 1407, from which the processor 1405 retrieves and executes the instructions. The instructions received by the main memory 1407 may optionally be stored on a storage device 1411 either before or after execution by the processor 1405.

The processor system 1401 also includes a communication interface 1419 coupled to the bus 1403. The communications interface 1419 provides a two-way UWB data communication coupling to a network link 1421 that is connected to a communications network 1423 such as a local network (LAN) or personal area network (PAN) 1423. For example, the communication interface 1419 may be a network interface card to attach to any packet switched UWB-enabled personal area network (PAN) 1423. As another example, the communication interface 1419 may be a UWB accessible asymmetrical digital subscriber line (ADSL) card, an integrated services digital network (ISDN) card, or a modem to provide a data communication connection to a corresponding type of communications line. The communications interface 1419 may also include the hardware to provide a two-way wireless communications coupling other than a UWB coupling, or a hardwired coupling to the network link 1421. Thus, the communications interface 1419 may incorporate the UWB transceiver of FIG. 1 and/or FIG. 2 as part of a universal interface that includes hardwired and non-UWB wireless communications coupling to the network link 1421.

The network link 1421 typically provides data communication through one or more networks to other data devices. For example, the network link 1421 may provide a connection through a LAN to a host computer 1425 or to data equipment operated by a service provider, which provides data communication services through an IP (Internet Protocol) network 1427. Moreover, the network link 1421 may provide a connection through a PAN 1423 to a mobile device 1429 such as a personal data assistant (PDA) laptop computer, or cellular telephone. The LAN/PAN communications network 1423 and EP network 1427 both use electrical, electromagnetic or optical signals that carry digital data streams. The signals through the various networks and the signals on the network link 1421 and through the communication interface 1419, which carry the digital data to and from the system 1401, are exemplary forms of carrier waves transporting the information. The processor system 1401 can transmit notifications and receive data, including program code, through the network(s), the network link 1421 and the communication interface 1419.

Obviously, numerous modifications and variations of the present invention are possible in light of the above teachings. It is therefore to be understood that with in the scope of the appended claims, the invention may be practiced otherwise than as specifically described herein.

What is claimed is:

1. A method for controlling in an ultra wide bandwidth (UWB) receiver transitions between synchronization states that include an acquisition mode and a tracking mode, comprising the steps of:
   identifying an in-band measure of a signal to noise ratio of an incoming UWB signal;
   comparing the in-band measure of signal to noise ratio identified in the identifying step with an in-band signal to noise ratio threshold;
   transitioning between the acquisition mode and the tracking mode when in the comparing step it is determined that the in-band measure of signal to noise ratio has satisfied a predetermined criteria relative to in-band signal to noise ratio threshold; and
   setting a number of samples of the incoming UWB signal to a predetermined number so as to controllably establish a predetermined performance level with regard to when to control a transition between the acquisition mode and the tracking mode.

2. The method of claim 1, wherein said identifying step includes calculating an estimate for an actual in-band measure of signal to noise ratio.

3. The method of claim 1, wherein said transitioning step includes transitioning between the acquisition mode and the tracking mode each time it is determined in the comparing step that the in-band measure of signal to noise ratio has either surpassed, or dropped below the in-band signal to noise ratio threshold.

4. The method of claim 1, wherein said predetermined performance level being at least one of a predetermined amount of immunity to noise bursts and bit error rate.

5. The method of claim 1, wherein the transitioning step includes transitioning from said acquisition mode to one of a predetermined number of alternative track states in said tracking mode.

6. The method of claim 5, wherein the predetermined number of alternative track states is based on a desired bit error rate to be achieved before a transition out of said tracking mode occurs.

7. A method for controlling in an ultra wide bandwidth (UWB) receiver transitions between synchronization states that include an acquisition mode and a tracking mode, comprising the steps of:

identifying at least two parameters that combine to form an indirect measure of a signal to noise ratio of an incoming UWB signal;

determining a control threshold parameter from a mathematical combination of the at least two parameters;

transitioning between the acquisition mode and the tracking mode when the control threshold is set to a predetermined value; and setting a number of samples of the incoming UWB signal to a predetermined number so as to controllably establish a predetermined performance level with regard to when to control a change between the acquisition mode and the tracking mode.

8. The method of claim 7, wherein the identifying step identifies the at least two parameters as an indirect measure of an in-band signal to noise ratio of the incoming UWB signal.

9. The method of claim 7, wherein said at least two parameters includes:

$$m_1 = \left(\sum_{i=1}^{B} |x_i|\right)^2$$

as a first of said at least two parameters, where $m_1$ an estimate of signal power and $x_i$ is a stream of samples taken by the UWB receiver; and $$s_1 = \sum_{i=1}^{B} x_i^2$$

as a second of said at least two parameters, where $s_1$ being a measure of noise power.

10. The method of claim 9, wherein:
said control parameter L is determined by $L = \text{sign}(m_1 - K s_1),$ where K is a constant.

11. The method of claim 7, wherein said at least two parameters includes:

$$l = \frac{1}{B} \sum_{i=1}^{B} |x_i|$$

as a first of said at least two parameters, where $l^2$ being an estimate of signal power, $x_i$ being a stream of samples taken by the UWB receiver and B being a number of samples; and $$g = \frac{1}{B} \sum_{i=1}^{B} |x_i|^2$$

as a second of said at least two parameters, where $g - l^2$ is an estimate of noise power.

12. The method of claim 11, wherein:
said control parameter L is determined by $$L = \begin{cases} 1, & \text{for } \frac{l^2}{g - l^2} \geq T_h \\ -1, & \text{for } \frac{l^2}{g - l^2} < T_h \end{cases}$$

where $T_h$ being a target level.

13. The method of claim 7, further comprising:
determining an estimate of noise power $n_i$ during automatic gain control (AGC) initialization, wherein
$n_i$ being a first of said at least two parameters, and
$A_i$ being a second of said at least two parameters and $A_i$ being an estimate of an amplitude of the incoming UWB signal.

14. The method of claim 13, wherein:
$A_i$ being obtained from a subtraction of $n_i$ from an absolute value of samples of the incoming UWB signal; and
said control parameter L being determined by $$L = \begin{cases} 1, & \text{for } \frac{l^2}{g - l^2} \geq T_h \\ -1, & \text{for } \frac{l^2}{g - l^2} < T_h \end{cases}$$

where $T_h$ being a target level.

15. The method of claim 7, wherein the identifying step further comprising the steps of:
computing a signal parameter related to signal power; and
computing a noise parameter related to noise power.

16. The method of claim 15, wherein the computing the signal parameter step further comprises the step of:
computing a sum of squares of absolute values of samples of the incoming UWB signal over a predetermined number of samples.

17. The method of claim 15, wherein the computing the noise parameter step further comprising the step of:
computing a sum of samples of the incoming UWB signal over a predetermined number of samples.

18. The method of claim 7, wherein the determining step further comprising the step of:
  computing a sign of a difference between a signal parameter and a scaled noise parameter.

19. The method of claim 7, wherein the determining step further comprising the steps of:
  computing a sum of absolute values of samples of the incoming UWB signal over a predetermined number of samples; and
  dividing the sum by the predetermined number of samples to obtain a first parameter of said at least two parameters.

20. The method of claim 7, wherein the determining step further comprising the steps of:
  computing a sum of a square of absolute values of samples of the incoming UWB signal over a predetermined number of samples; and
  dividing the sum by the predetermined number of samples to obtain a second parameter of said at least two parameters.

21. The method of claim 7, wherein the transitioning step includes transitioning between a predetermined number of alternative track states.

22. The method of claim 7, wherein said step of identifying at least two parameters includes:
  determining noise variance as a step in an automatic gain control initialization operation; and
  identifying the noise variance determined in said determining step as one of said at least two parameters.

23. The method of claim 7, wherein said transitioning step includes transitioning between said acquisition mode and said tracking mode in a state machine, wherein said tracking mode being associated with a plurality of states so as to provide immunity to burst errors.

24. The method of claim 7, wherein said step of identifying includes representing respective of said at least two parameters with adjustable length vectors so as to enable an adjustable degree of mode control precision.

25. A method for switching between an acquisition mode and a tracking mode in an ultra wide bandwidth (UWB) receiver, comprising the steps of:
  monitoring an amplitude of an incoming UWB signal;
  determining a state parameter from the amplitude based on a noise variance of the incoming UWB signal determined during automatic gain control (AGC) initialization; and
  controlling a transition from the acquisition mode to the tracking mode when the state parameter is set to a predetermined value.

26. The method of claim 25, wherein:
  said monitoring step includes setting a number of samples of the incoming UWB signal to a predetermined value so as to controllably establish a predetermined degree of mode control precision.

27. The method of claim 25, wherein the controlling step includes transitioning from said acquisition mode to a predetermined number of alternative track states of said tracking mode.

28. The method of claim 27, wherein the predetermined number of alternative track states is based on a predetermined bit error rate.

29. The method of claim 27, wherein the predetermined number of alternative track states is based on a predetermined degree of immunity to burst errors for a synchronization process implemented in the UWB receiver.

30. A mode controller for switching between an acquisition mode and a tracking mode of an ultra wide bandwidth (UWB) receiver, comprising:
  an acquire state machine configured to determine when an incoming UWB signal is acquired by said UWB receiver;
  a track state machine configured to maintain synchronization with the incoming UWB signal after the UWB signal has been acquired in said acquire state machine;
  a control mechanism configured to control a transition between the acquire state machine and the track state machine when an in-band measure of signal to noise ratio satisfies a predetermined condition; and
  a setting mechanism for setting a length of samples of the incoming UWB signal to a predetermined number so a transition between the acquire and track state machines occurs with a predetermined performance accuracy.

31. The mode controller of claim 30, wherein the track state machine comprises:
  a processor configured to determine the in-band measure of the signal to noise ratio of the incoming UWB signal and calculate whether the in-band measure of signal to noise ratio satisfies a predetermined criteria that corresponds with a predetermined bit error rate.

32. The mode controller of claim 30, wherein:
  the track state machine includes a predetermined number of tracking states, said predetermined number of tracking states corresponding with a degree of immunity to burst errors offered by the track state machine.

33. A controller configured to control when to switch between an acquisition mode and a tracking mode in an ultra wide bandwidth (UWB) receiver, comprising:
  means for identifying an in-band measure of a signal to noise ratio of an incoming UWB signal;
  means for comparing the in-band measure of signal to noise ratio with an in-band signal to noise ratio threshold;
  means for controlling a transition between the acquisition mode and the tracking mode when said means for comparing identifies that the in-band measure of signal to noise ratio has satisfied a predetermined criteria; and
  means for setting a vector length of samples of the incoming UWB signal to a predetermined number so a transition between modes occurs with a predetermined performance accuracy.

34. The controller of claim 33, wherein said predetermined performance accuracy is represented as at least one of a predetermined amount of immunity to noise bursts and bit error rate.

35. A controller configured to control when to switch between an acquisition mode and a tracking mode in an ultra wide bandwidth (UWB) receiver, comprising:
  means for identifying at least two parameters that are an indirect measure of a signal to noise ratio of an incoming UWB signal;
  means for determining a control threshold parameter L from a mathematical combination of the at least two parameters;
  means for transitioning between the acquisition mode and the tracking mode when the control threshold parameter L is set to a predetermined value by said means for determining; and
  means for setting a number of samples of the incoming signal to a predetermined number so as to controllably establish a predetermined performance level with regard to when to implement a change between the acquisition mode and the tracking mode.

36. The controller of claim 35, wherein the means for identifying includes:
means for identifying as a first of said at least two parameters, $$m_1 = \left(\sum_{i=1}^{B} |x_i|\right)^2$$

where $m_1$ being an estimate of signal power and $x_i$ being a stream of samples taken by the UWB receiver, and
means for identifying as a second of said at least two parameters, $$s_1 = \sum_{i=1}^{B} x_i^2$$

where $s_1$ being a measure of noise power.

37. The controller of claim 36, wherein the means for identifying includes:
said control threshold parameter L being determined by $L = \text{sign}(m_1 - Ks_1)$, where K being a constant.

38. The controller of claim 35, wherein said at least two parameters includes:
means for identifying as a first of said at least two parameters, $$l = \frac{1}{B}\sum_{i=1}^{B} |x_i|$$

where $l^2$ being an estimate of signal power, $x_i$ being a stream of samples taken by the UWB receiver and B being a number of samples; and
means for identifying as a second of said at least two parameters, $$g = \frac{1}{B}\sum_{i=1}^{B} |x_i|^2$$

where $g-l^2$ estimates noise power.

39. The controller of claim 38, wherein:
said means for determining determines tie control parameter L by $$L = \begin{cases} 1, & \text{for } \frac{l^2}{g-l^2} \geq T_h \\ -1, & \text{for } \frac{l^2}{g-l^2} < T_h \end{cases}$$

where $T_h$ being a target level.

40. The controller of claim 35, wherein the means for determining comprises:
means for computing a sum of absolute values of samples of the incoming UWB signal over a predetermined number of samples; and
means for dividing the sum by the predetermined number of samples to obtain a first parameter of said at least two parameters.

41. The controller of claim 35, wherein the means for transitioning includes means for transitioning between a predetermined number of alternative track states.

42. The controller of claim 35, wherein said means for transitioning includes means for transitioning between states in a state machine, wherein said tracking mode being associated with a plurality of states so as to provide immunity against burst errors.

43. The controller of claim 35, wherein said means for identifying includes means for representing respective of said at least two parameters with adjustable length vectors so as to enable an adjustable degree of precision with which mode control is performed.

44. A controller configured to control when to switch between an acquisition mode and a tracking mode in an ultra wide bandwidth (UWB) receiver, comprising:
means for monitoring an amplitude of an incoming UWB signal;
means for determining a state parameter from the amplitude based on a noise variance of the incoming UWB signal determined during automatic gain control (AGC) initialization; and
mean for controlling a transition from the acquisition mode to the tracking mode when the state parameter is set to a predetermined value.

45. The controller of claim 44, wherein:
said means for monitoring includes means for setting a number of samples of the incoming UWB signal to a predetermined number so as to controllably establish a predetermined degree of precision with which the transition between the acquisition mode and the tracking mode is performed.

46. The controller of claim 44, wherein the means for controlling includes means for transitioning from said acquisition mode to a predetermined number of alternative track states of said tracking mode.

47. The method of claim 46, wherein the means for transitioning includes means for providing immunity to burst errors.

48. A mode controller for switching between an acquisition mode and a tracking mode of an ultra wide bandwidth (UWB) receiver, comprising:
means for determining when an incoming UWB signal is acquired by said UWB receiver;
means for maintaining synchronization with the incoming UWB signal after the UWB signal has been acquired in said means for determining;
means for estimating an in-band signal to noise ratio;
means for controlling a transition between the acquisition mode and the tracking mode when the estimate of signal to noise ratio satisfies a predetermined condition; and
means for setting a length of samples of the incoming UWB signal to a predetermined number so a transition between modes occurs with a predetermined performance accuracy.

49. An ultra wide bandwidth (UWB) receiver configured to transition between an acquisition mode and a tracking mode, comprising:
an analog to digital converter configured to sample an incoming UWB signal;
a processor;

a computer program product having computer readable instructions that when executed by the processor perform steps of identifying an in-band measure of a signal to noise ratio of an incoming UWB signal;

comparing the in-band measure of signal to noise ratio identified in the identifying step with an in-band signal to noise ratio threshold;

transitioning between the acquisition mode and the tracking mode when in the comparing step it is determined that the in-band measure of signal to noise ratio has satisfied a predetermined criteria relative to in-band signal to noise ratio threshold; and setting a vector length of samples of the incoming UWB signal to a predetermined number so a transition between modes will occur with in a predetermined reception performance metric.

50. The receiver of claim 49, wherein said computer program product further comprising computer readable instructions that when executed by the processor implement a step of calculating a proxy for an actual signal to noise ratio.

51. The receiver of claim 49, wherein said transitioning step includes transitioning between the acquisition mode and the tracking mode each time it is determined in the comparing step that the in-band measure of signal to noise ratio has either surpassed, or dropped below the in-band signal to noise ratio threshold.

52. The receiver of claim 49, wherein said predetermined reception performance metric being at least one of a predetermined amount of immunity to noise bursts and bit error rate.

53. The receiver of claim 52, wherein the predetermined number of alternative track states is based on bit error rate.

54. The method of claim 49, wherein the transitioning step includes transitioning from said acquisition mode to one of a predetermined number of alternative tracking states in said track mode.

55. An ultra wide bandwidth (UWB) receiver configured to transition between an acquisition mode and a tracking mode during synchronization operations, comprising:

an analog to digital converter configured to sample an incoming UWB signal;

a processor;

a computer program product having computer readable instructions that when executed by the processor perform steps of identifying at least two parameters that are an indirect measure of a signal to noise ratio of an incoming UWB signal, determining a control threshold parameter from a mathematical combination of the at least two parameters, transitioning between the acquisition mode and the tracking mode when the control threshold is set to a predetermined value in said determining step; and a data detector configured to detect data included in the incoming UWB signal; and setting a number of samples of the incoming signal to a predetermined number so as to controllably establish a predetermined performance level with regard to when to control a change between the acquisition mode and the tracking mode.

56. The receiver of claim 55, wherein the identifying step identifies the at least two parameters as an indirect measure of an in-band signal to noise ratio of the incoming UWB signal.

57. The receiver of claim 55, wherein said at least two parameters includes:

$$m_1 = \left(\sum_{i=1}^{B} |x_i|\right)^2$$

as a first of said at least two parameters, where $m_1$ being an estimate of signal power and $x_i$ being a stream of samples taken by the UWB receiver; and $$s_1 = \sum_{i=1}^{B} x_i^2$$

as a second of said at least two parameters, where $s_1$ being a measure of noise power.

58. The receiver of claim 57, wherein:

said control parameter L being determined by $L=\text{sign}(m_1-Ks_1)$, where K being a constant.

59. The receiver of claim 55, wherein said at least two parameters includes:

$$l = \frac{1}{B}\sum_{i=1}^{B} |x_i|$$

as a first of said at least two parameters, where $l^2$ being an estimate of signal power, $x_i$ being a stream of samples taken by the UWB receiver and B being a number of samples; and $$g = \frac{1}{B}\sum_{i=1}^{B} |x_i|^2$$

as a second of said at least two parameters, where $g-l^2$ estimates noise power.

60. The receiver of claim 59, wherein:

said control parameter L being determined by $$L = \begin{cases} 1, & \text{for } \frac{l^2}{g-l^2} \geq T_h \\ -1, & \text{for } \frac{l^2}{g-l^2} < T_h \end{cases}$$

where $T_h$ being a target level.

61. The receiver of claim 55, wherein:

said computer program product containing instructions that when executed by said processor perform a step of determining an estimate of noise power $n_i$ during automatic gain control (AGC) initialization, wherein $n_i$ being a first of said at least two parameters, and $A_i$ being a second of said at least two parameters and $A_i$ being an estimate of an amplitude of the incoming signal.

62. The receiver of claim 61, wherein:

$A_i$ being obtained from $n_i$ being subtracted from an absolute value of the incoming UWB signal; and said control parameter L being determined by $$L = \begin{cases} 1, \text{ for } \dfrac{l^2}{g-l^2} \geq T_h \\ -1, \text{ for } \dfrac{l^2}{g-l^2} < T_h \end{cases}$$

where $T_h$ being a target level.

63. The receiver of claim 55, wherein said computer program product containing instructions that when executed by said processor perform steps of:
  computing a signal parameter related to signal power; and
  computing a noise parameter related to noise power.

64. The receiver of claim 63, wherein said computer program product containing instructions that when executed by said processor perform a step of:
  computing a sum of squares of absolute values of samples of the incoming UWB signal over a predetermined number of samples.

65. The receiver of claim 63, wherein said computer program product containing instructions that when executed by said processor perform a step of:
  computing a sum of samples of the incoming UWB signal over a number of samples.

66. The receiver of claim 55, wherein said computer program product containing instructions that when executed by said processor perform a step of:
  computing a sign of a difference between a signal parameter and a scaled noise parameter.

67. The receiver of claim 55, wherein said computer program product containing instructions that when executed by said processor perform steps of:
  computing a sum of absolute values of samples of the incoming UWB signal over a predetermined number of samples; and
  dividing the sum by the predetermined number of samples to obtain a first parameter of said at least two parameters.

68. The receiver of claim 55, wherein said computer program product containing instructions that when executed by said processor perform steps of:
  computing a sum of a square of absolute values of samples of the incoming UWB signal over a predetermined number of samples; and
  dividing the sum by the predetermined number of samples to obtain a second parameter of said at least two parameters.

69. The receiver of claim 55, wherein said computer program product containing instructions that when executed by said processor perform a step of transitioning between a predetermined number of alternative track states.

70. The receiver of claim 55 wherein said computer program product containing instructions that when executed by said processor perform steps of:
  determining noise variance as an initialization step in an automatic gain control operation; and
  identifying the noise variance determined in said determining step as one of said at least two parameters.

71. The receiver of claim 55, wherein said computer program product containing instructions that when executed by said processor perform a step of transitioning between said acquisition mode and said tracking mode in a state machine, wherein said tracking mode being associated with a plurality of states so as to provide immunity to burst errors.

72. The receiver of claim 55, wherein said computer program product containing instructions that when executed by said processor perform a step of representing respective of said at least two parameters with adjustable length vectors so as to enable an adjustable degree of precision with which mode control is performed.

73. An ultra wide bandwidth (UWB) receiver configured to switch between an acquisition mode and a tracking mode during reception of an incoming UWB signal, comprising:
  an analog to digital converter configured to sample the incoming UWB signal;
  a processor;
  a computer program product having computer readable instructions that when executed by the processor perform steps of
    monitoring an amplitude of the incoming UWB signal,
    determining a state parameter from the amplitude based on a noise variance of the incoming UWB signal determined during automatic gain control (AGC) initialization, and
    controlling a transition from the acquisition mode to the tracking mode when the state parameter is set to a predetermined value; and
  a data detector configured to detect data in the incoming UWB signal.

74. The receiver of claim 73, wherein said computer program product containing instructions that when executed by said processor perform a step of
  setting a number of samples of the incoming UWB signal to a predetermined value so as to controllably establish a predetermined degree of precision with which said controlling step is performed.

75. The receiver of claim 74, wherein said computer program product containing instructions that when executed by said processor perform a step of transitioning from said acquisition mode to a predetermined number of alternative track states of said tracking mode.

76. The receiver of claim 75, wherein the predetermined number of alternative track states is based on a predetermined bit error rate.

77. The method of claim 75, wherein the predetermined number of alternative track states is based on a predetermined degree of immunity for a synchronization process executed in the UWB receiver to burst errors.

78. The controller of claim 35, further comprising:
  means for determining an estimate of noise power $n_i$ during automatic gain control (AGC) initialization, wherein
  $n_i$ being a first of said at least two parameters, and
  $A_i$ being a second of said at least two parameters and $A_i$ being an estimate of an amplitude of the incoming UWB signal.

* * * * *

UNITED STATES PATENT AND TRADEMARK OFFICE
CERTIFICATE OF CORRECTION

PATENT NO. : 6,965,630 B1
APPLICATION NO. : 09/685197
DATED : November 15, 2005
INVENTOR(S) : Timothy R. Miller It is certified that error appears in the above-identified patent and that said Letters Patent is hereby corrected as shown below:

In Column 21, Line 52, Claim No. 9:
Change "at least two parameters, where $m_1$ an" to --at least two parameters, where $m_1$ is an--

In Column 25, Line 52, Claim No. 39:
Change "said means for determining determines tie control" to --said means for determining determines the control--

Signed and Sealed this

Fifth Day of August, 2008

JON W. DUDAS
*Director of the United States Patent and Trademark Office*